(12) United States Patent
Ishikawa et al.

(10) Patent No.: US 6,603,929 B2
(45) Date of Patent: Aug. 5, 2003

(54) CAMERA SYSTEM AND LENS APPARATUS

(75) Inventors: Masanori Ishikawa, Tokyo (JP); Toru Kawai, Tokyo (JP); Ryuji Suzuki, Tokyo (JP); Seiichi Kashiwaba, Tokyo (JP); Shigeki Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/172,655

(22) Filed: Jun. 14, 2002

(65) Prior Publication Data

US 2003/0012568 A1 Jan. 16, 2003

(30) Foreign Application Priority Data

Jun. 20, 2001 (JP) .................................... 2001-186751

(51) Int. Cl.[7] .............................................. G03B 13/36
(52) U.S. Cl. ................................................... 396/133
(58) Field of Search ................................ 396/104, 101, 396/133, 135, 136

(56) References Cited

U.S. PATENT DOCUMENTS 4,473,743 A * 9/1984 Ishikawa ................. 396/133 X
6,040,677 A * 3/2000 Oono et al. ............. 396/135 X
6,055,378 A * 4/2000 Oono et al. ............. 396/133 X

* cited by examiner

Primary Examiner—W. B. Perkey
(74) Attorney, Agent, or Firm—Morgan & Finnegan LLP

(57) ABSTRACT

The present invention discloses a camera system comprising: a first focus detection unit, which detects the focusing condition of an image-taking optical system; a second focus detection unit, which detects the focusing condition of the image-taking optical system at a higher precision than the first focus detection unit; and a control circuit, which controls a stepping motor for driving a focus lens. The control circuit performs closed loop control for driving the stepping motor based on the output of a rotation detector, which detects the rotation phase of the stepping motor, when controlling the stepping motor using the information based on the output of the first focus detection unit, and performs open control for driving the stepping motor a predetermined number of steps at a time, when controlling the stepping motor using the information based on the output of the second focus detection unit. The autofocus process is thereby made high in speed and high in precision at the same time.

15 Claims, 14 Drawing Sheets

CAMERA SYSTEM AND LENS APPARATUS

BACKGROUND OF THE INVENTION

1. Field of the Invention

This invention relates to a camera system, which has a plurality of focus detection units and makes a focus lens perform a focusing operation based on the outputs of these focus detection units.

2. Description of the Related Art

Conventional focus detection units used for autofocusing include those that make use of the phase difference detection method and those that make use of the contrast detection method.

With the phase difference detection method, the subject image that is formed from the light flux that enters through an image-taking lens is divided into two parts of light flux, the amount and direction of defocus are detected from the phase difference of the two images formed by image forming the two divided parts of light flux again, and the amount of feeding of the focus lens is determined from this defocus amount. This phase difference detection method has the merit of being wide in the range of defocus that can be detected.

Meanwhile, with the contrast detection method, the subject image formed from the light flux that enters through an image-taking lens and is made incident on an image pickup device is taken in, the high frequency components are extracted, and the focus lens is moved to find the position at which the extracted signal is maximized and bring the image plane to the focused plane in the final stage.

With this contrast detection method, though the focusing process takes a long time since the amount and direction of defocus cannot be determined immediately, the merit that focusing precision that is high in comparison to the phase difference detection method is provided, and especially with digital cameras, since the image pickup device that performs photoelectric conversion of the subject image can be used directly as the image intake part of the focus detection unit, high focusing precision can be obtained without being affected by the precision of relative positioning among image pickup devices.

A camera system has been proposed which combines the above two methods of focus detection while making use of their merits, that is, with which the focusing process is made high in speed by the phase difference detection method and focusing operation by the contrast method is performed in part to achieve focusing of higher precision.

However, with the prior-art camera system, though considerations are made in regard to a focus detection method by which high speed and high precision of autofocusing can be realized at the same time, considerations are not made in regard to the accompanying drive control of a focus lens.

For example, in the case where a focus lens is driven by a stepping motor, in order to realize high precision, the feeding amount of the lens that is driven in one step of the motor must be set to no more than the minimum pitch determined from the focusing precision, and if the pulse rate is set so that step-out of the stepping motor will not occur, the drive time for autofocus becomes long with the increase of the lens feeding amount, thus preventing the speeding up of autofocus. Thus though the prior art indicates a focus detection method for realizing high speed and high precision of autofocusing at the same time, it does not accompany a lens drive control for realizing this and thus does not adequately realize high speed and high precision of autofocusing at the same time.

SUMMARY OF THE INVENTION

An object of this invention is to perform lens drive control that is optimal for each focus detection unit in a camera system that employs a plurality of focus detection methods in combination to realize high speed and high precision of autofocusing at the same time.

In order to achieve the above object, this invention provides a camera system comprising:
- an image-taking optical system, which forms a subject image from the light flux that has entered the image-taking optical system;
- a first focus detection unit, which detects the focusing condition of the image-taking optical system;
- a second focus detection unit, which detects the focusing condition of the image-taking optical system at a higher precision than the first focus detection unit;
- a stepping motor, which drives a focus lens included in the image-taking optical system;
- a control circuit, which selectively uses information based on the output from the first focus detection unit and information based on the output from the second focus detection unit to control the stepping motor; and
- a rotation detector, which detects the rotation phase of the stepping motor.

The control circuit performs closed loop control, based on the output of the abovementioned rotation detector, when controlling the stepping motor using the information based on the output of the first focus detection unit, and performs open control for driving the stepping motor a predetermined number of steps at a time, when controlling the stepping motor using the information based on the output of the second focus detection unit.

Also in order to achieve the above object, this invention provides a camera system comprising:
- an image-taking optical system, which forms a subject image from the light flux that has entered the image-taking optical system;
- a first focus detection unit, which detects the focusing condition of the image-taking optical system;
- a second focus detection unit, which detects the focusing condition of the image-taking optical system at a higher precision than the first focus detection unit;
- a stepping motor, which drives a focus lens included in the image-taking optical system; and
- a control circuit, which selectively uses information based on the output from the first focus detection unit and information based on the output from the second focus detection unit to control the stepping motor.

The control circuit drives the stepping motor by a 2-phase excitation method when controlling the stepping motor using the information based on the output of the first focus detection unit, and drives the stepping motor by a 1–2-phase excitation method or microstep method when controlling the stepping motor using the information based on the output of the second focus detection unit.

Also in order to achieve the above object, this invention provides a camera system comprising:
- an image-taking optical system, which forms a subject image from the light flux that has entered the image-taking optical system;
- a first focus detection unit, which detects the focusing condition of the image-taking optical system;

a second focus detection unit, which detects the focusing condition of the image-taking optical system at a higher precision than the first focus detection unit;

a vibration type motor, which drives a focus lens included in the image-taking optical system;

a control circuit, which selectively uses information based on the output from the first focus detection unit and information based on the output from the second focus detection unit to control the vibration type motor; and a vibration condition detector, which detects the vibration condition of the vibration type motor.

The control circuit performs closed loop control, by which the drive frequency is controlled based on the output of the vibration condition detector, when controlling the vibration type motor using the information based on the output of the first focus detection unit, and performs control for applying a drive signal of fixed frequency to the vibration type motor, when controlling the vibration type motor using the information based on the output of the second focus detection unit.

With each of the above inventions, the first focus detection unit may be arranged to detect the focusing condition of the image-taking optical system by a phase difference detection method and the second focus detection unit may be arranged to detect the focusing condition of the image-taking optical system by a contrast detection method. In this case, information on the defocus amount may be the information based on the output of the first focus detection unit and information on the contrast (high frequency components) of the subject image that has been taken in may be the information based on the output of the second focus detection unit.

Also, with each of the above inventions, the control circuit may be arranged to control the stepping motor or vibration type motor using the information based on the output of the first focus detection unit when the information based on the output of the first focus detection unit indicates the image-taking optical system to be in an out-of-focus condition that falls outside a predetermined range, and to control the stepping motor or vibration type motor using the information based on the output of the second focus detection unit when the information based on the output of the first focus detection unit indicates the image-taking optical system to be in an out-of-focus condition that is within the predetermined range.

Also in order to achieve the above object, this invention provides a lens device which is provided with an image-taking optical system that forms a subject image from the light flux that has entered the image-taking optical system, being detachably mountable to a camera which comprises a first focus detection unit that detects the focusing condition of the image-taking optical system and a second focus detection unit that detects the focusing condition of the image-taking optical system at a higher precision than the first focus detection unit, furthermore comprising:

a communication circuit, which enable communication of information with the camera;

a stepping motor, which drives a focus lens included in the image-taking optical system;

a control circuit, which selectively uses information based on the output from the first focus detection unit and information based on the output from the second focus detection unit to control the stepping motor; and a rotation detector, which detects the rotation phase of the stepping motor.

The control circuit performs closed loop control, based on the output of the rotation detector, when controlling the stepping motor using the information based on the output of the first focus detection unit, and performs open control for driving the stepping motor a predetermined number of steps at a time, when controlling the stepping motor using the information based on the output of the second focus detection unit.

Also in order to achieve the above object, this invention provides a lens device which is provided with an image-taking optical system that forms a subject image from the light flux that has entered the image-taking optical system, being detachably mountable to a camera which comprises a first focus detection unit that detects the focusing condition of the image-taking optical system and a second focus detection unit that detects the focusing condition of the image-taking optical system at a higher precision than the first focus detection unit, furthermore comprising:

a communication circuit, which enable communication of information with the camera;

a stepping motor, which drives a focus lens included in the image-taking optical system; and a control circuit, which selectively uses information based on the output from the first focus detection unit and information based on the output from the second focus detection unit to control the stepping motor.

The control circuit drives the stepping motor by a 2-phase excitation method when controlling the stepping motor using the information based on the output of the first focus detection unit, and drives the stepping motor by a 1–2-phase excitation method or microstep method when controlling the stepping motor using the information based on the output of the second focus detection unit.

Also in order to achieve the above object, this invention provides a lens device which is provided with an image-taking optical system that forms a subject image from the light flux that has entered the image-taking optical system, being detachably mountable to a camera which comprises a first focus detection unit that detects the focusing condition of the image-taking optical system and a second focus detection unit that detects the focusing condition of the image-taking optical system at a higher precision than the first focus detection unit, furthermore comprising:

a communication circuit, which enable communication of information with the camera;

a vibration type motor, which drives a focus lens included in the image-taking optical system;

a control circuit, which selectively uses information based on the output from the first focus detection unit and information based on the output from the second focus detection unit to control the vibration type motor; and a vibration condition detector, which detects the vibration condition of the vibration type motor; wherein the control circuit performs closed loop control, by which the drive frequency is controlled based on the output of the vibration condition detector when controlling the vibration type motor using the information based on the output of the first focus detection unit, and performs control for applying a drive signal of fixed frequency to the vibration type motor, when controlling the vibration type motor using the information based on the output of the second focus detection unit.

A detailed configuration of the camera system and lens device of the invention, the above and other objects and features of the invention will be apparent from the embodiments, described below.

DETAILED DESCRIPTION OF THE PREFERRED EMBODIMENTS

Hereinafter, preferred embodiments of the invention will be described in detail with reference to the drawings.

Figure 1:
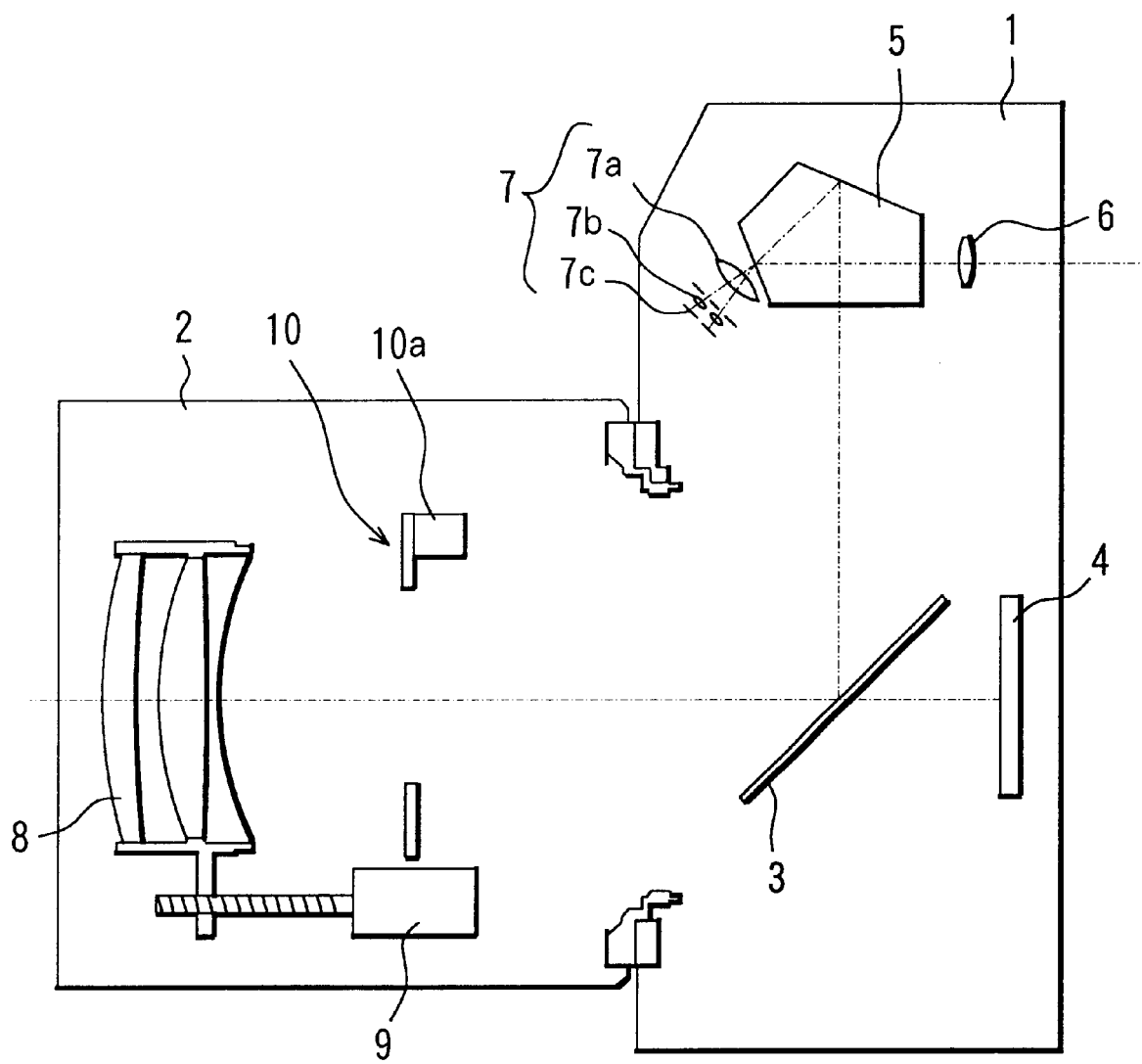
FIG. 1 is a sectional view of a lens-exchangeable, single-lens reflex digital camera system, which is an embodiment of this invention.

FIG. 1 is a sectional view of a lens-exchangeable, digital, single-lens reflex camera system, which is an embodiment of this invention.

In FIG. 1, 1 denotes a camera, 2 denotes an exchangeable lens (lens apparatus), which is detachably mountable to the camera 1, and the lens-exchangeable, digital, single lens reflex camera system comprises the camera 1 and the exchangeable lens 2.

The camera 1 and the exchangeable lens 2 comprise the following components. First, with the camera 1, 3 denotes a quick return mirror, which comprises a half mirror and, prior to image-taking, is disposed on the optical axis of a light flux that has passed through the lens 2 to divide a part of the light flux towards an image pickup device 4 to be described later and the rest of the light flux to a viewfinder optical system to be described later. The quick return mirror 3 is withdrawn from the optical axis during image-taking.

The image pickup device 4 comprises a CCD or CMOS, etc., and serves as the image pickup part that performs photoelectric conversion of the subject image that has been formed via the lens 2 and, prior to image-taking, takes in light flux that have been transmitted through the quick return mirror 3 and serves as an image intake part of a contrast detection type focus detection unit (which shall be referred to hereinafter as the "second focus detection unit).

The viewfinder optical system comprises a pentaprism 5 and an ocular lens 6. At the pentaprism 5, a part of the light flux that has entered is directed towards a phase difference detection type focus detection unit (which shall be referred to hereinafter as the "first focus detection unit) 7.

The first focus detection unit 7 comprises a condenser lens 7a, which splits the incident light flux into two parts of light flux, two separator lenses 7a, each of which re-forms an image from each of the two parts of light flux that have been split by the condenser lens 7a, and line sensors 7c, each of which comprises a CCD or CMOS, etc., that perform photoelectric conversion of the formed subject image.

With the exchangeable lens 2, 8 denotes a focus lens. 9 denotes a stepping motor, which serves as an actuator for driving the focus lens 8 and transmits a driving force to the focus lens 8 by rotating a lead screw that is disposed integrally on an output shaft to thereby drive the focus lens 8 in the optical axis direction.

the focus lens 8 is provided with an unillustrated member that engages with the abovementioned lead screw, which may be a rack, etc., and converts the rotation of this lead screw to movement in the direction of the optical axis of the focus lens 8. The focus lens 8 is also rectilinearly guided in the optical axis direction by an unillustrated guide shaft.

10 denotes an aperture-stop unit that adjusts the amount of light, among the light flux that enters into the exchangeable lens 2, that reaches the image pickup device 4.

Figure 2:
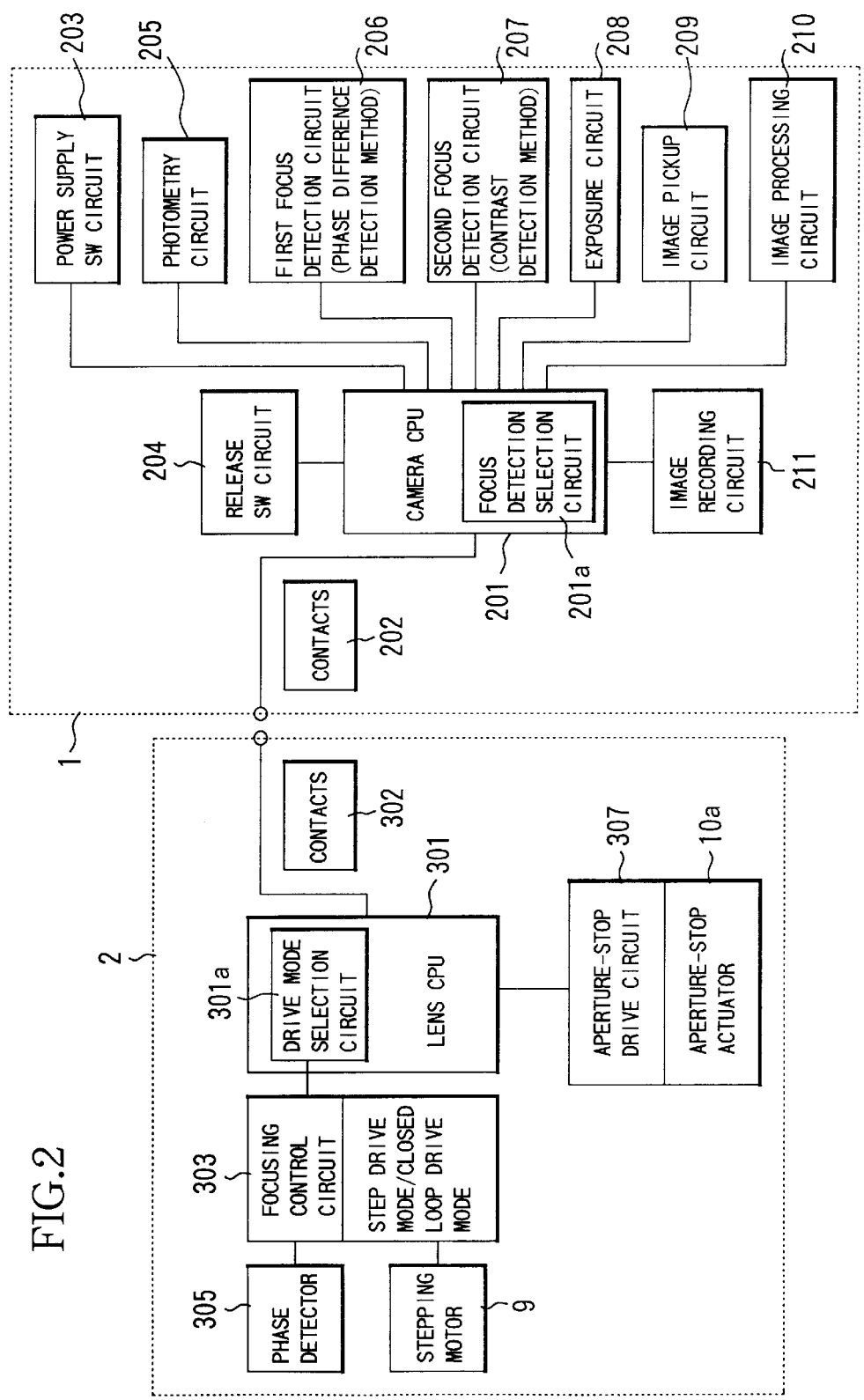
FIG. 2 is a block diagram of the digital camera system of FIG. 1.

FIG. 2 is a block diagram, which shows the arrangement of electric circuit in the above-described lens-exchangeable, digital, single-lens reflex camera system.

In FIG. 2, 1 indicates the camera and 2 indicates the exchangeable lens. The arrangement of the electrical circuit of the camera 1 side shall first be described. 201 denotes a camera CPU, which comprises a microcomputer and, as shall be described later, controls the various operations of the camera system and performs communication with a lens CPU 301 via camera contacts 202 when the exchangeable lens 2 is installed.

The camera contacts 202 include a signal transmission contact, which transmits signals to the lens side, and a power supply contact, which supplies power to the lens side. 203 denotes a power supply SW circuit, which is operable from the exterior and is a switch for starting up the camera CPU 201 and setting the condition in which the supply of power to the respective actuators, sensors, etc., within the system and operations of the system are enabled.

204 denotes a release SW circuit equipped with a two-stroke type release SW, which is operable from the exterior, generates an SW1 signal in accordance with the ON operation of an unillustrated first stroke (half-pressed) switch, and generates an SW2 signal in accordance with the ON operation of an unillustrated second stroke (fully-pressed) switch. These signals are input into the camera CPU 201.

When the SW1 signal is input from the release SW circuit 204, the camera CPU 201 starts the image-taking preparation operation. The first, the exposure amount is determined by a photometry circuit 205. Also with the input of the SW1 signal, the camera CPU 201 makes a first focus detection circuit 206 perform focusing condition detection, in other words, focus detection computation of the image-taking optical system inside exchangeable lens 2 by the phase difference detection method in accordance with the outputs of line sensors 7c of the first focus detection unit 7. And also the camera CPU 201 makes a second focus detection circuit 207 perform focus detection computation by the contrast detection method in accordance with the output from the image pickup device 4 shown in FIG. 1.

Inside the camera CPU 201, a focus detection selection circuit 201a makes a selection between using the computation result (defocus amount) of the first focus detection circuit 206 and using the computation result (contrast (high frequency components) value) of the second focus detection circuit 207 in the focusing operation. The camera CPU 201 then makes a below-described focusing control circuit inside the exchangeable lens 2 perform focusing control based on the information of the selected computation result.

At the focus detection selection circuit 201a, if the computation result (defocus amount) at the first focus detection circuit 206 is greater than a predetermined value, the output of the first focus detection circuit 206 is selected and if the computation result is less than or equal to the predetermined value, the output of the second focus detection circuit 207 is selected.

Upon detection of the ON operation of the second stroke switch (SW2), the camera CPU 201 sends an aperture-stop operation instruction to the below-described lens CPU 301 inside the exchangeable lens 2 and sends a start exposure instruction to an exposure circuit 208. Upon receiving the start exposure instruction, the exposure circuit 208 performs photoelectric conversion of the subject image that is formed on the image pickup device 4, which is shown in FIG. 1 and is included in an image pickup circuit 209, and outputs an image signal.

An image processing circuit 210 digitizes and compresses this image signal, and an image recording circuit 211 records and saves the image signal in a recording medium, such as a flash memory or other semiconductor memory, magnetic disk, optical disk, etc.

The electrical circuit arrangement inside the exchangeable lens 2 shall now be described. The lens CPU 301 controls the various operations within the exchangeable lens 2 and, upon installation onto the camera 1, performs communication with the camera CPU 201 via lens contacts (communication circuit) 302.

The lens contacts 302 include a signal transmission contact, to which signals are transmitted from the camera side, and a power supply contact, to which power is supplied from the camera side.

303 denotes a focusing control circuit, which controls the driving of the stepping motor 9 shown in FIG. 1 and provides, as drive modes, a step drive mode (open control mode), in which the stepping motor 9 is driven a predetermined number of steps (for example, one step) at a time, and a closed loop drive mode, in which the detection result of a phase detector 305 that detects the rotation phase of the stepping motor 9 is fed back in order to drive stepping motor 9 to a target rotation phase.

Selection between these drive modes is made by a drive mode selection circuit 301a inside the lens CPU 301 in accordance with information, received from the camera 1 side, that indicates which focus detection circuit's output has been selected. To be more specific, if the output of the first focus detection circuit 206 has been selected at the camera 1 side, the closed loop drive mode is selected at the drive mode selection circuit 301a, and if the output of second focus detection circuit 207 has been selected at the camera 1 side, the step drive mode is selected at the drive mode selection circuit 301a.

An aperture-stop drive circuit 307, which drives the aperture-stop unit 10, is controlled by the lens CPU 301, which has received the aperture opening or closing operation instruction from the camera CPU 201, and drives an aperture-stop actuator 10a, which is shown in FIG. 1 too, and opens and closes aperture blades that are not shown.

With the camera system of the above-described arrangement, in the case where the output from the first focus detection circuit 206, that is, the result of focusing condition detection (computation) by the phase difference detection method is selected by the focus detection selection circuit 201a inside the camera CPU 201 (in the case where the defocus amount is greater than the predetermined value), the drive mode selection circuit 301a inside the lens CPU 301 selects the closed loop drive mode. The lens CPU 301 makes the focusing control circuit 303 drive the stepping motor 9 at high speed until the phase detected by phase detector 305 reaches a target rotation phase of the stepping motor 9 that has been computed based on the defocus amount. Rough focusing of the focus lens 8 shown in FIG. 1 is thereby performed at high speed.

Thereafter, when the defocus amount becomes less than or equal to the predetermined value and the output from the second focus detection circuit 207, that is, the result of focusing condition detection (computation) by the contrast detection method is selected by the focus detection selection circuit 201a, drive mode selection circuit 301a selects the step drive mode. The lens CPU 301 makes the focusing control circuit 303 drive stepping motor 9 one step at a time (step by step). The focusing lens 8 shown in FIG. 1 is thereby driven at a microscopic pitch to perform high precision focusing operation to the position at which the contrast (high frequency components), detected by the second focus detection circuit 207, is maximized.

In the case where the defocus amount is less than or equal to the predetermined value from the beginning and the output of the second focus detection circuit 207 has been selected, focusing operation of the focus lens 8 by drive control in the step drive mode is performed.

Figure 3:
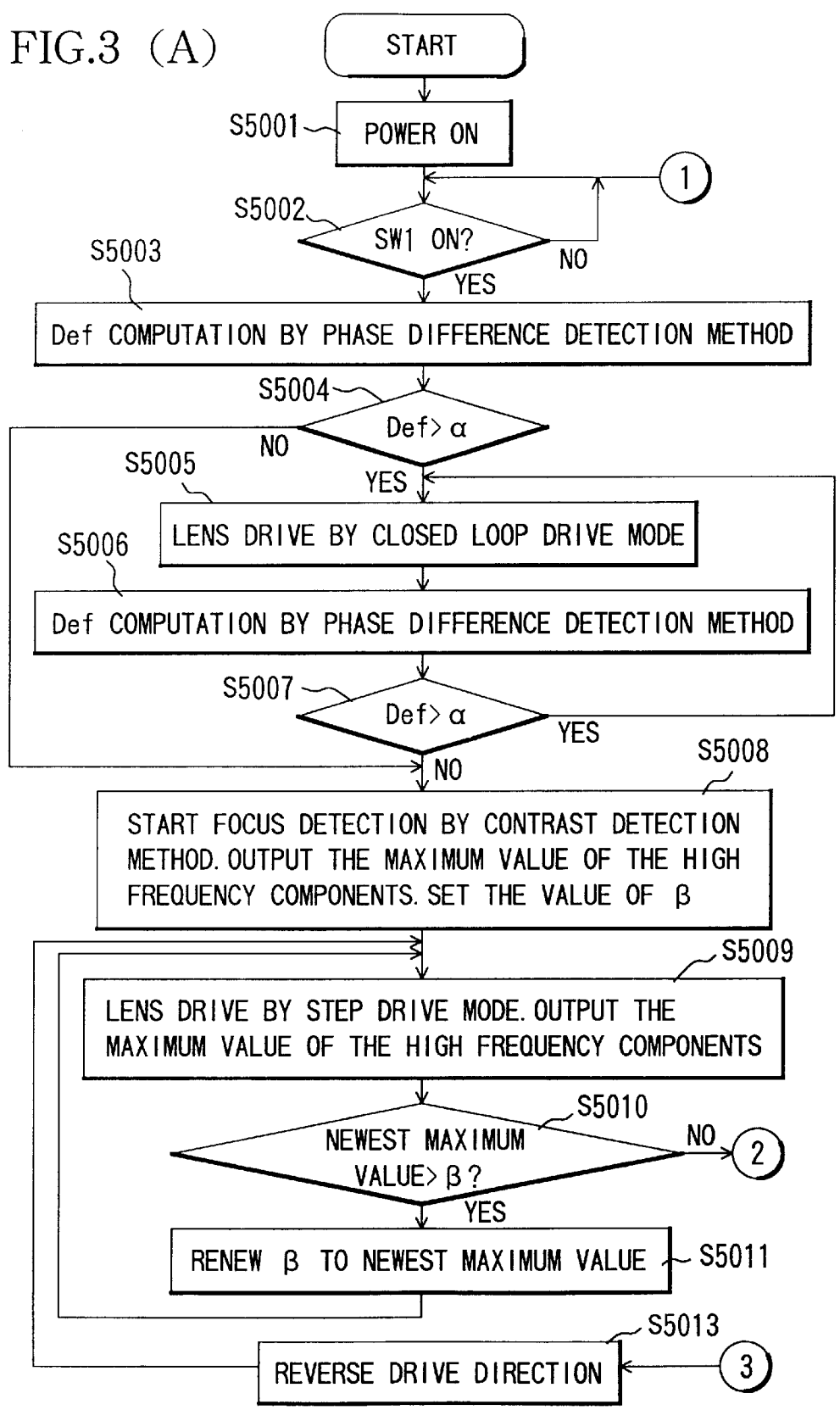
FIG. 3 is a flowchart, which illustrates the operations of the digital camera system of FIG. 1.
Figure 3:
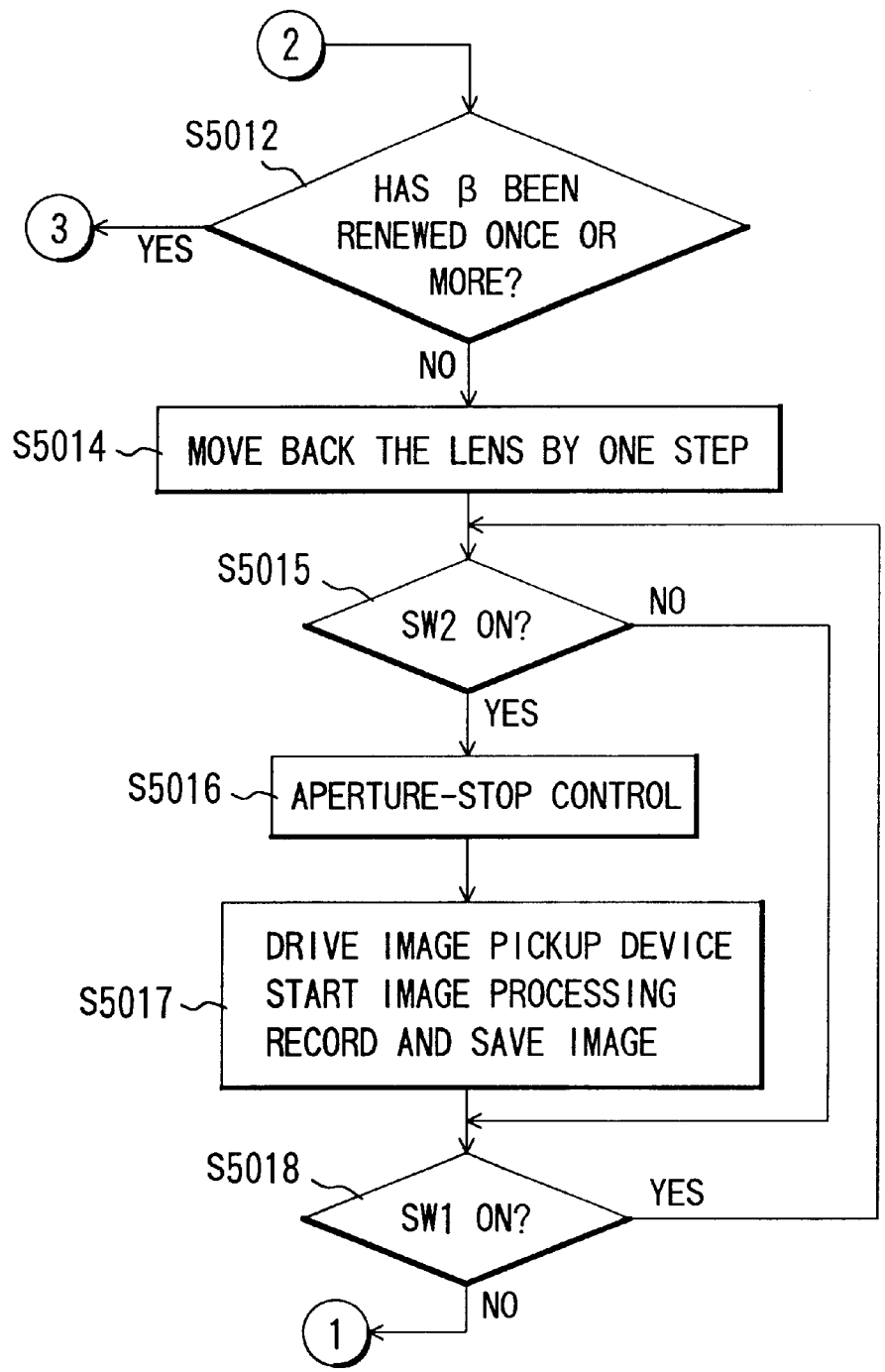

FIGS. 3(A) and 3(B) show a flowchart, which illustrates the principle operations of the camera system shown in FIG. 2. In FIG. 2, lines added the same circled numeral are connected to each other.

First, when the power supply SW circuit 203, shown in FIG. 2, becomes ON (step (abbreviated as "S" in the Figure) 5001), the supply of power to the exchangeable lens 2 is started (or in the case where new batteries are loaded in the camera 1 or in the case where the exchangeable lens 2 is installed on the camera 1, etc., communication between the camera 1 and the exchangeable lens 2 is started).

The camera CPU 201 then judges whether or not the SW1 signal is generated from the release SW circuit 204 in accordance with the ON operation of the first stroke switch SW1 (step 5002) and, if the signal is generated, performs focusing condition detection by the phase difference detection method using the first focus detection circuit 206, in other words, performs the computation of the defocus amount (shall be referred to hereinafter as "Def") (step 5003).

The focus detection selection circuit 201a inside the camera CPU 201 then judges whether or not the computed defocus amount Def is greater than the predetermined value $\alpha$ (step 5004) and if the Def is greater than the value $\alpha$, a signal expressing that the output from the first focus detection circuit 206 is used is sent from the camera CPU 201 to the lens CPU 301 and a step 5005 is entered. If the defocus amount Def is less than or equal to the predetermined value $\alpha$, a signal expressing that the output from the second focus detection circuit 207 is used is sent from the camera CPU 201 to the lens CPU 301 and a step 5008 is entered.

In the step 5005, the drive mode selection circuit 301a inside the lens CPU 301 selects the closed loop drive mode in accordance with the signal sent from the camera CPU 201 in the step 5004. Also, based on the Def information sent from the camera 1 side, the focusing control circuit 303 computes the target rotation phase of the stepping motor 9. The focusing control circuit 303 then performs closed loop control of the stepping motor 9 while detecting its rotation phase by means of the phase detector 305 and drives the focus lens 8 until the rotation phased detected by the phase detector 305 reaches the target rotation phase.

After stoppage of the focus lens 8, computation of Def by the first focus detection circuit 206 is performed again (step 5006), whether or not the computed Def is greater than the predetermined value α is judged again (step 5007), and if Def is greater than the predetermined value α, step 5005 is returned to or if Def is less than or equal to the predetermined value α, a step 5008 is entered.

In the step 5008, focusing condition detection by the contrast detection method using the second focus detection circuit 207 is started. The contrast, in other words, high frequency components of the subject image formed on the image pickup device 4, shown in FIG. 1, are extracted, and the maximum value of these high frequency components is output. The camera CPU 201 sends a signal expressing this maximum value to the focusing control circuit 303 via the lens CPU 301 and the focusing control circuit 303 sets this maximum value as β.

Meanwhile, the drive mode selection circuit 301a in the lens CPU 301 selects the step drive mode in accordance with the signal sent from the camera CPU 301 in step the 5004. The focusing control circuit 303 drives the stepping motor 9 by one step in a predetermined direction to drive the focusing lens 8, and after this one-step drive, the second focus detection circuit 207 is made to extract the high frequency components of the subject image and output the maximum value again (step 5009). The camera CPU 201 sends the signal expressing this maximum value (the newest maximum value) to the focusing control circuit 303.

The focusing control circuit 303 compares this newest maximum value with the priorly set β (step 5010), and a step 5011 is entered if the newest maximum value is greater than β, while a step 5012 is entered if the newest maximum value is less than or equal to β.

In the step 5011, the focusing control circuit 303 renews the value of β to the newest maximum value and then a return to the step 5009 is performed.

In the step 5012, the focusing control circuit 303 judges whether or not the renewal of the value of β has been performed once or more and if the renewal has been performed once or more, judges that the peak of the maximum value has been exceeded and a step 5014 is entered. If the renewal has not been performed even once, it is judged that the focusing direction is the opposite direction, a step 5013 is entered, the driving direction of the stepping motor 9 is reversed, and the step 5009 is returned to. In the step 5014, the stepping motor 9 is driven in the opposite direction for one step and then the focusing operation is ended.

When the focusing operation is thus ended, the camera CPU 201 judges whether or not the SW2 signal that is output with the ON operation of the second stroke switch is generated by the release SW circuit 204 (step 5015). If the SW2 signal is not generated, the camera CPU 201 judges again whether or not the SW1 signal is generated (step 5018). Here, if the SW1 signal is also not generated, the step 5002 is returned to. Also, if in the step 5018, the SW2 signal is not generated but the SW1 signal is generated, a return to the step 5015 is performed.

If in the step 5015, the SW2 signal is generated from the release SW circuit 204, the lens CPU 301 controls the aperture-stop drive circuit 307 of the aperture-stop unit 10 (step 5016). Also, the camera CPU 201 drives the image pickup device 4, shown in FIG. 1, and makes photoelectric conversion of the optical image formed on the image pickup device 4 be performed. The camera CPU 201 then makes the image processing circuit 210 process the image signal resulting from photoelectric conversion and records and saves the image signal in the recording medium by means of the image recording circuit 211 (step 5017).

The camera CPU 201 then checks the condition of the SW1 signal (step 5018) and when the SW1 signal is no longer generated, a return to the step 5002 is performed.

With the camera system of the present embodiment, the above series of operations is repeated until the power SW circuit 203 is turned OFF, and when the power is turned OFF, the camera CPU 201 and the lens CPU 301 end communication and the supply of power to the exchangeable lens 2 is also ended.

Though a lens-exchangeable, digital, single-lens reflex camera system was described with the present embodiment, this invention may also be applied to an integral lens type digital camera system.

Also, though with the present embodiment, the case where focus detection units, which make use of the phase difference detection method, as a so-called passive range finding method, and the contrast detection method, are used as the first and second focus detection units was described, focus detection units may be equipped which use a so-called active range finding method, in which the reflected light of light projected onto a subject is used to detect the focusing condition, and the contrast detection method.

The drive control of the stepping motor 9 of the present embodiment shall now be described in more detail by use of FIG. 4.

Figure 4:
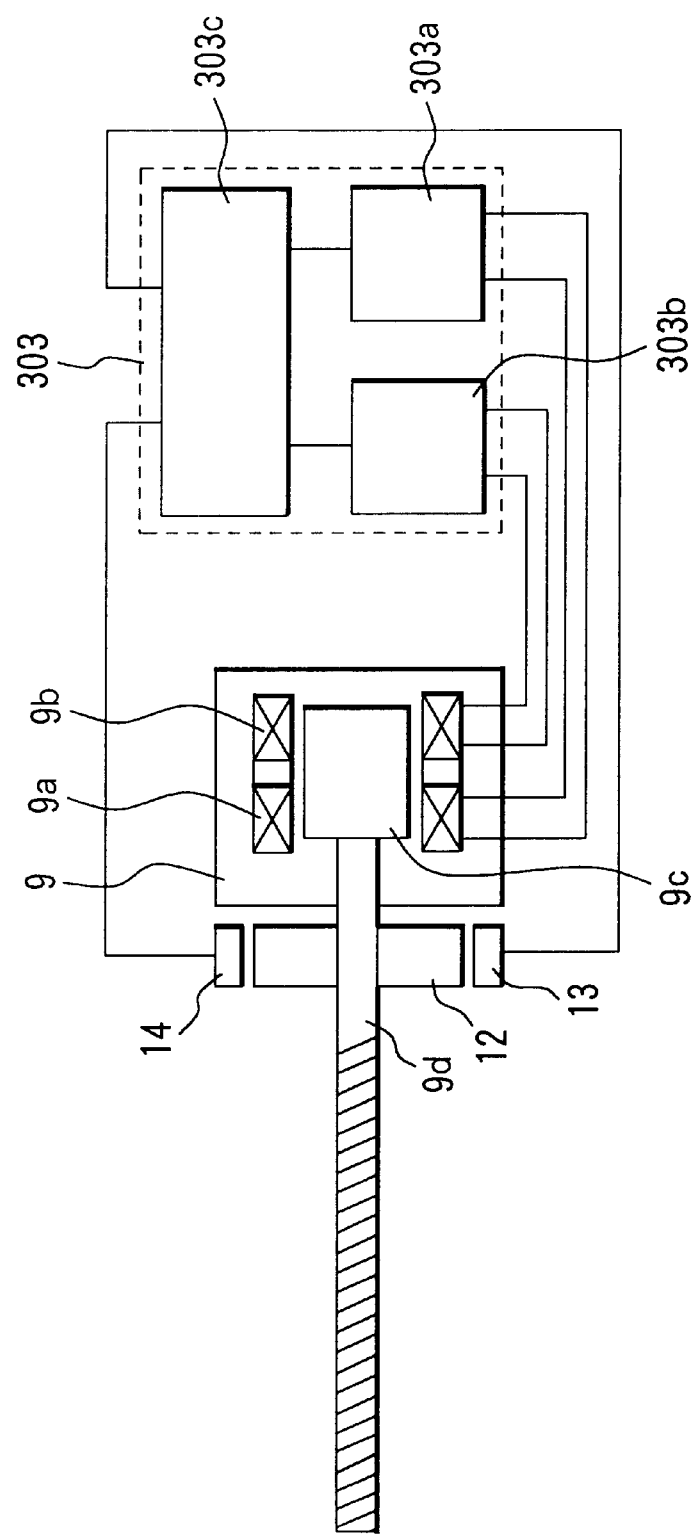
FIG. 4 is an arrangement diagram of a stepping motor and a focusing control circuit in the digital camera system of FIG. 1.

FIG. 4 is a diagram for explaining the arrangement of the stepping motor 9 and the focusing control circuit 303, shown in FIG. 2. The stepping motor 9 comprises a 2-phase excitation coil, which in turn comprises an A-phase stator 9a and a B-phase stator 9b, a rotor 9c, and a lead screw 9d, which is directly connected to rotor 9c.

12 denotes an encoder magnet, which mounted integrally to the lead screw 9d and is magnetized to a plurality of poles for detection of the rotation phase of the stepping motor 9, and two Hall elements 13 and 14 are provided to detect the rotation phase as the above-described phase detector 305, shown in FIG. 1.

The focusing control circuit 303 comprises an A-phase driver 303a, which makes electricity flow through the A-phase stator 9a, a B-phase driver 303b, which makes electricity flow through the B-phase stator 9b, and a control part 303c, which controls the A-phase driver 303a and the B-phase driver 303b.

The control part 303c controls the A-phase driver 303a and the B-phase driver 303b based on the drive mode selection information, lens drive amount information, and drive direction information provided by the lens CPU 301, shown in FIG. 2, and the rotation phase information on the stepping motor 9 provided by the Hall elements 13 and 14.

With the above arrangement, in the case where the closed loop drive mode has been selected by the drive mode selection circuit 301a inside the lens CPU 301, the focusing control circuit 303 controls the A-phase driver 303a and the B-phase driver 303b based on the rotation phase information on the stepping motor 9 provided by the Hall elements 13 and 14 to make electricity flow through the A-phase stator 9a and the B-phase stator 9b and make the stepping motor 9 rotate at high speed.

In this process, since the focusing control circuit 303 constantly detects the rotation phase of the stepping motor 9 by means of the outputs of the Hall elements 13 and 14, even if the stepping motor 9 is subject to high speed drive at a large pulse rate that will cause the stepping motor 9 to fall out of step, the stepping motor 9 can be stopped at substantially the target rotation phase.

On the other hand, when the step drive mode has been selected by the drive mode selection circuit 301a, the focusing control circuit 303 controls the A-phase driver 303a and the B-phase driver 303b to make electricity flow through the A-phase stator and the B-phase stator and make the stepping motor 9 rotate one step at a time (step by step).

Though it has been described that with the present embodiment, the stepping motor 9 is driven one step at a time in the step drive mode, the ratio of currents that are made to flow through the A-phase stator and the B-phase stator may be varied to perform microstep drive to thereby increase the drive resolution and achieve higher precision in focusing.

Figure 5:
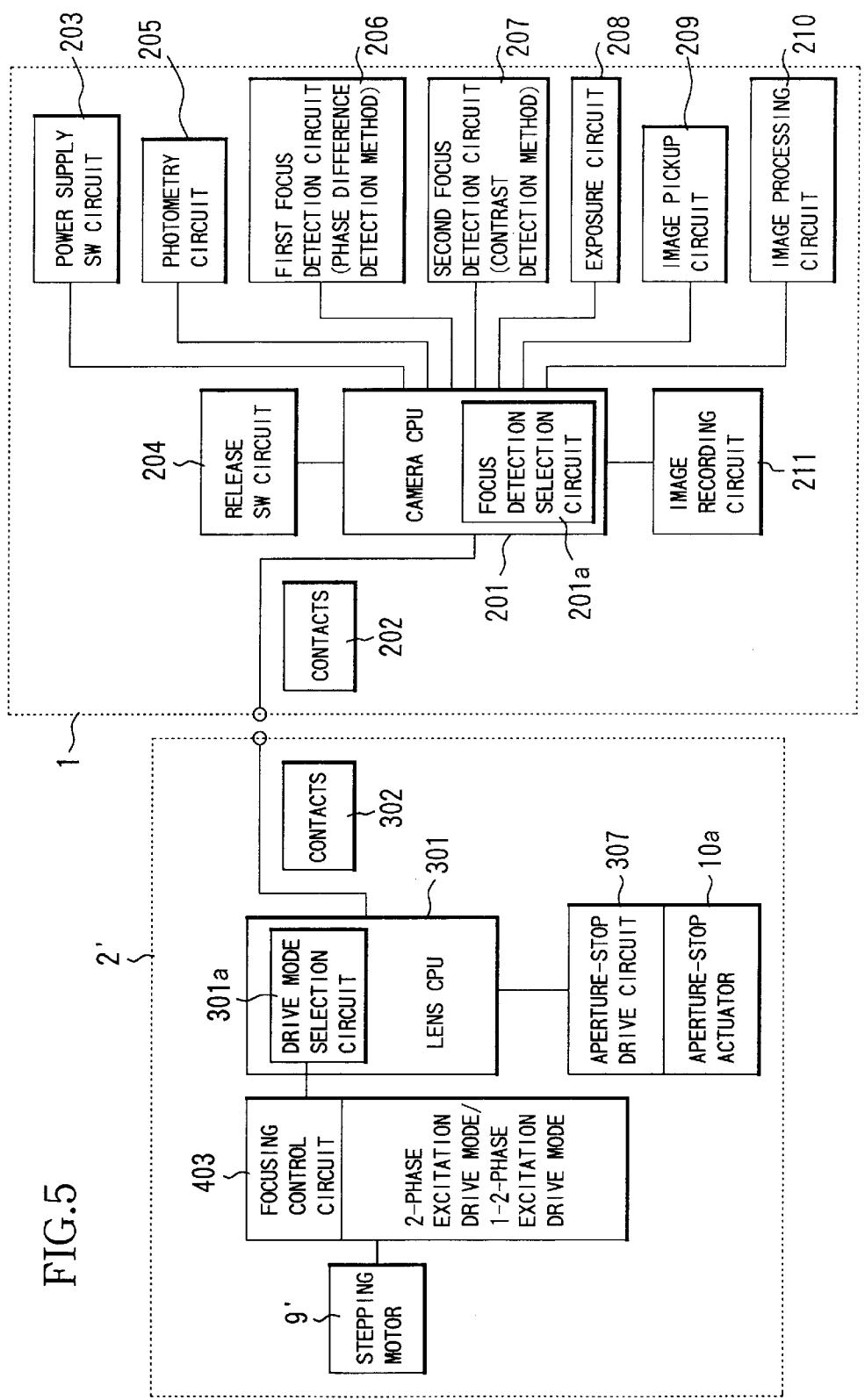
FIG. 5 is a block diagram of a lens-exchangeable, single-lens reflex digital camera system, which is another embodiment of this invention.

FIG. 5 is a block diagram of a lens-exchangeable, digital, single-lens reflex camera system, which is another embodiment of this invention.

This embodiment differs from the above-described embodiment in the arrangement of the focusing control circuit 403 and the stepping motor 9' of an exchangeable lens 2', and accordingly, a phase detector is not provided in the stepping motor 9'. Besides this point, this embodiment is the same as the above-described embodiment, and components that are in common are provided with the same symbols as the above-described embodiments and descriptions thereof shall be omitted.

When the drive mode is selected by the drive mode selection circuit 301a in the lens CPU 301 in accordance with the information, received from the camera 1 side, that indicates which focus detection circuit(206, 207)'s output has been selected, the focusing control circuit 403 performs drive control of the stepping motor 9' in accordance with the selected drive mode and thereby drives the focus lens 8 shown in FIG. 1 to perform the focusing operation. Here, the drive modes that are provided are the 1–2-phase excitation drive mode, in which the stepping motor 9' is subject to 1–2-phase excitation drive, and the 2-phase excitation drive mode, in which the stepping motor 9' is subject to 2-phase excitation drive.

With the above arrangement, when the output of the first focus detection circuit 206, which performs focusing condition detection by the phase difference detection method, is selected by the focus detection selection circuit 201a inside the camera CPU 201 (when the defocus amount is greater than a predetermined value), the drive mode selection circuit 301a inside the lens CPU 301 selects the 2-phase excitation drive mode. In this case, the focusing control circuit 403 makes the stepping motor 9' rotate at high speed by 2-phase excitation drive and thereby drives the stepping motor 9' by a target step number computed based on the defocus amount. The lens CPU 301 judges whether or not the stepping motor 9' has been driven by the target step number by counting the drive pulse signals for 2-phase excitation that has been applied to the stepping motor 9' by the focusing control circuit 403. Rough focusing of the focus lens 8 is thus performed at high speed.

Thereafter, when the defocus amount becomes less than or equal to the predetermined value and the output from the second focus detection circuit 207, that is, the result of focusing condition detection (computation) by the contrast detection method is selected by the focus detection selection circuit 201a, the drive mode selection circuit 301a selects the 1–2-phase excitation drive mode. In this case, the focusing control circuit 403 drives the stepping motor 9' one step at a time by 1–2-phase excitation drive. The focus lens 8 shown in FIG. 1 is thereby driven at a microscopic pitch and a high-precision focusing operation is performed to the position at which the contrast (high frequency components) detected by the second focus detection circuit 207 is maximized.

In the case where the defocus amount is less than or equal to the abovementioned predetermined value from the beginning and the output of the second focus detection circuit 207 has been selected, focusing operation of the focus lens 8 by drive control of the stepping motor 9' in the 1–2-phase excitation drive mode is performed.

Figure 6:
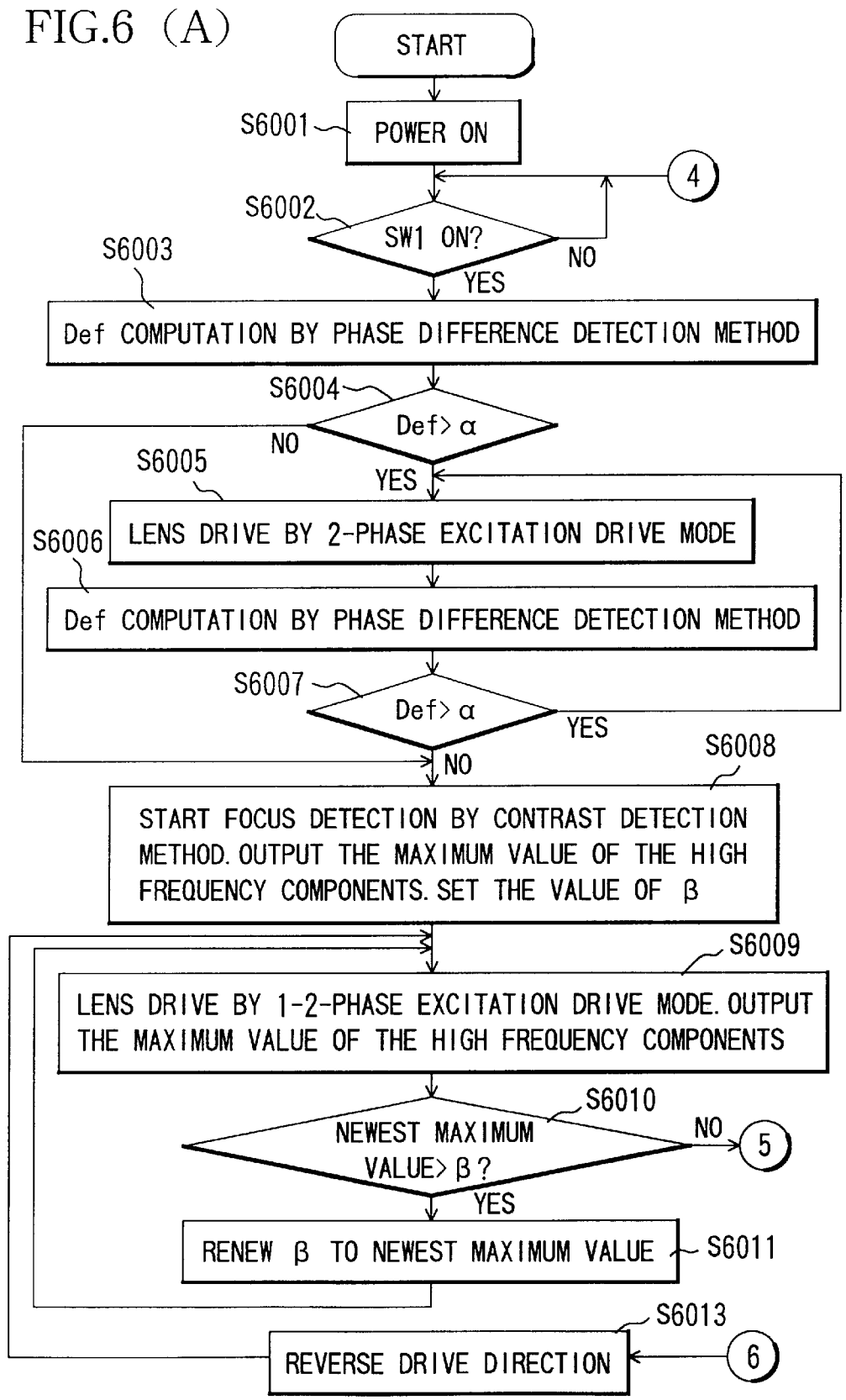
FIG. 6 is a flowchart, which illustrates the operation of the digital camera system of FIG. 5
Figure 6:
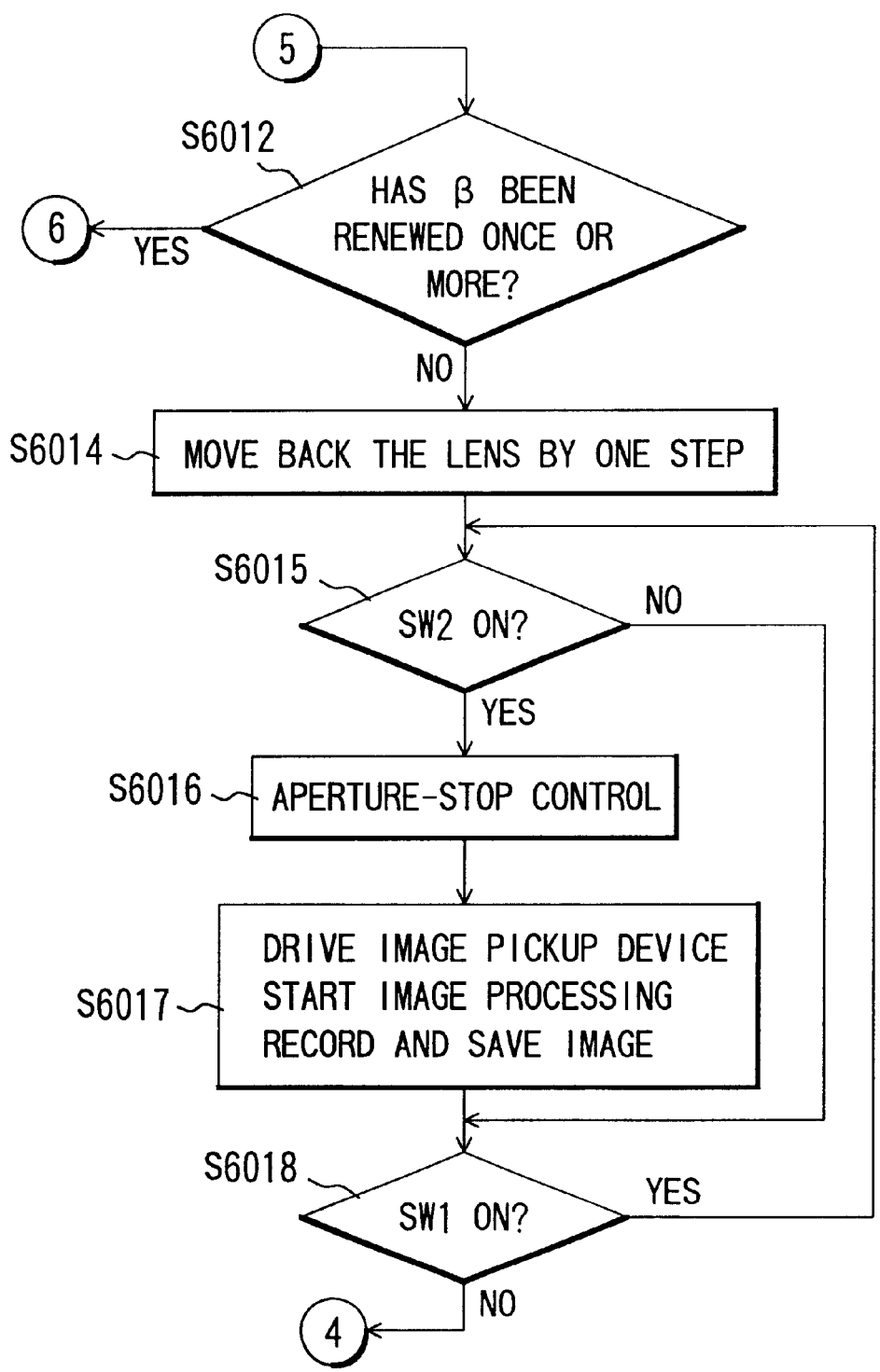

FIGS. 6(A) and 6(B) show a flowchart, which illustrates the principle operations of the camera system shown in FIG. 5.

First, when the power supply SW circuit 203, shown in FIG. 5, becomes ON (step 6001), the supply of power to the exchangeable lens 2' is started (or in the case where new batteries are loaded in the camera 1 or in the case where the exchangeable lens 2' is installed on the camera 1, etc., communication between the camera 1 and the exchangeable lens 2 is started).

The camera CPU 201 then judges whether or not the SW1 signal is generated from the release SW circuit 204 in accordance with the ON operation of the first stroke switch SW1 (step 6002) and, if the signal is generated, performs focusing condition detection by the phase difference detection method using the first focus detection circuit 206, in other words, performs the computation of the defocus amount (shall be referred to hereinafter as "Def") (step 6003).

The focus detection selection circuit 201a inside the camera CPU 201 then judges whether or not the computed defocus amount Def is greater than the predetermined value α (step 6004) and if Def is greater than the value α, a signal expressing that the output from the first focus detection circuit 206 is used is sent from the camera CPU 201 to the lens CPU 301 and a step 6005 is entered. If the defocus amount Def is less than or equal to the predetermined value α, a signal expressing that the output from the second focus detection circuit 207 is used is sent from the camera CPU 201 to the lens CPU 301 and a step 6008 is entered.

In the step 6005, the drive mode selection circuit 301a inside the lens CPU 301 selects the 2-phase drive mode in accordance with the signal sent from the camera CPU 201 in the step 6004. Based on the Def information sent from the camera 1 side, the focusing control circuit 403 computes the target drive step number of the stepping motor 9'.

The focusing control circuit 403 then performs 2-phase excitation drive of the stepping motor 9' and drives the focus lens 8 until the drive pulse number for 2-phase excitation drive reaches the target drive step number.

After stoppage of the focus lens 8, Def computation by the phase difference detection method by the first focus detection circuit 206 is performed again (step 6006), whether or not the computed Def is greater than the predetermined value α is judged again (6007), and if the defocus amount Def is greater than the predetermined value α, the step 6005 is returned to or if the defocus amount Def is less than or equal to the predetermined value α, step 6008 is entered.

In the step 6008, focusing condition detection by the contrast detection method using the second focus detection circuit 207 is started, the high frequency components of the subject image formed on the image pickup device 4, shown in FIG. 1, are extracted, and the maximum value of these high frequency components is output. The camera CPU 201 sends a signal expressing this maximum value to the focusing control circuit 403 via the lens CPU 301 and the focusing control circuit 403 sets this maximum value as β.

Meanwhile, the drive mode selection circuit 301a in the lens CPU 301 selects the 1–2-phase drive mode in accordance with the signal sent from the camera CPU 201 in the step 6004. The focusing control circuit 403 performs 1–2-phase excitation drive of the stepping motor 9' in a predetermined direction to drive the focusing lens 8, and after driving by one step, the second focus detection circuit 207 is made to extract the high frequency components of the subject image and output the maximum value again (step 6009). The camera CPU 201 sends the signal expressing this maximum value (the newest maximum value) to the focusing control circuit 403 via the lens CPU 301.

The focusing control circuit 403 compares this newest maximum value with the priorly set β (step 6010), and a step 6011 is entered if the newest maximum value is greater than β, while a step 6012 is entered if the newest maximum value is less than or equal to β.

In the step 6011, the focusing control circuit 403 renews the value of β to the newest maximum value and then a return to the step 6009 is performed.

In the step 6012, it is judged whether or not the renewal of the value of β has been performed once or more and if renewal has been performed once or more, it is judged that the peak of the maximum value has been exceeded and a step 6014 is entered. If renewal has not been performed even once, it is judged that the focusing direction is the opposite direction, a step 6013 is entered. In the step 6013, the driving direction of the stepping motor 9' is reversed, and the step 6009 is returned to.

In the step 6014, stepping motor 9' is driven in the opposite direction for one step and then the focusing operation is ended.

When the focusing operation is thus ended, the camera CPU 201 judges whether or not the SW2 signal that is output with the ON operation of the second stroke switch SW2 is generated by the release SW circuit 204 (step 6015). If the SW2 signal is not generated, judges again whether or not the SW1 signal is generated (step 6018). Here, if the SW1 signal is also not generated, the step 6002 is returned to. Also, if in the step 6018, the SW2 signal is not generated but the SW1 signal is generated, a return to the step 6015 is performed.

If in the step 6015, the SW2 signal is generated from the release SW circuit 204, the lens CPU 301 controls the aperture-stop drive circuit 307 of the aperture-stop unit 10 (step 6016). Also, the camera CPU 201 drives the image pickup device 4, shown in FIG. 1, and makes photoelectric conversion of the optical image formed on the image pickup device 4 be performed. The camera CPU 201 then makes the image processing circuit 210 process the image signal resulting from photoelectric conversion and records and saves the image signal in an unillustrated recording medium by means of the image recording circuit 211 (step 6017).

The camera CPU 201 then checks the condition of the SW1 signal (step 6018) and when the SW1 signal is no longer generated, a return to the step 6002 is performed.

With the camera system of the present embodiment, the above series of operations is repeated until the power SW circuit 203 is turned OFF, and when the power is turned OFF, the camera CPU 201 and the lens CPU 301 end communication and the supply of power to the exchangeable lens 2' is also ended.

Though a lens-exchangeable, digital, single-lens reflex camera system was described with the present embodiment, this invention may also be applied to an integral lens type digital camera system.

Also, though with the present embodiment, the case where focus detection units, which make use of the phase difference detection method, as a so-called passive range finding method, and the contrast detection method, are used as the first and second focus detection units was described, focus detection units may be equipped which use a so-called active range finding method, in which the reflected light of light projected onto a subject is used to detect the focusing condition, and the contrast detection method.

Figure 7:
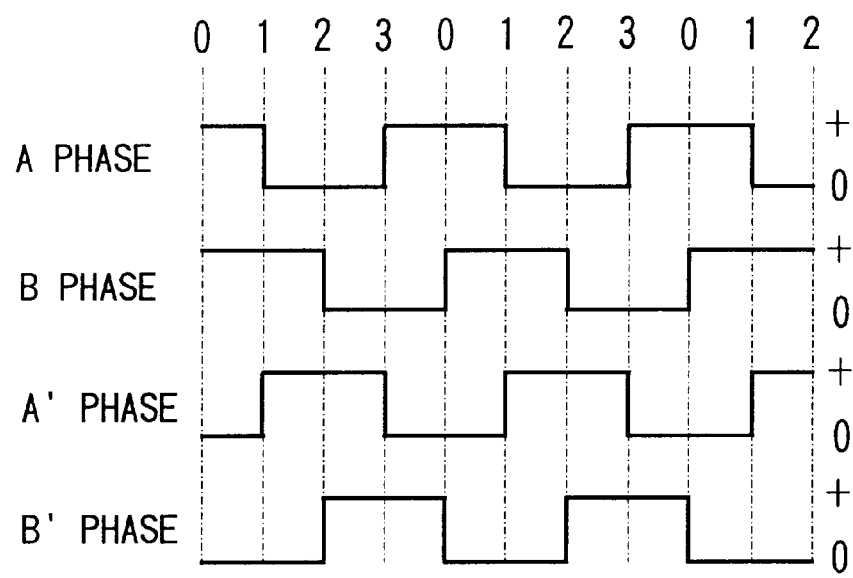
FIG. 7 shows timing charts, which illustrate the control of a stepping motor in the digital camera system of FIG. 5.
Figure 7:
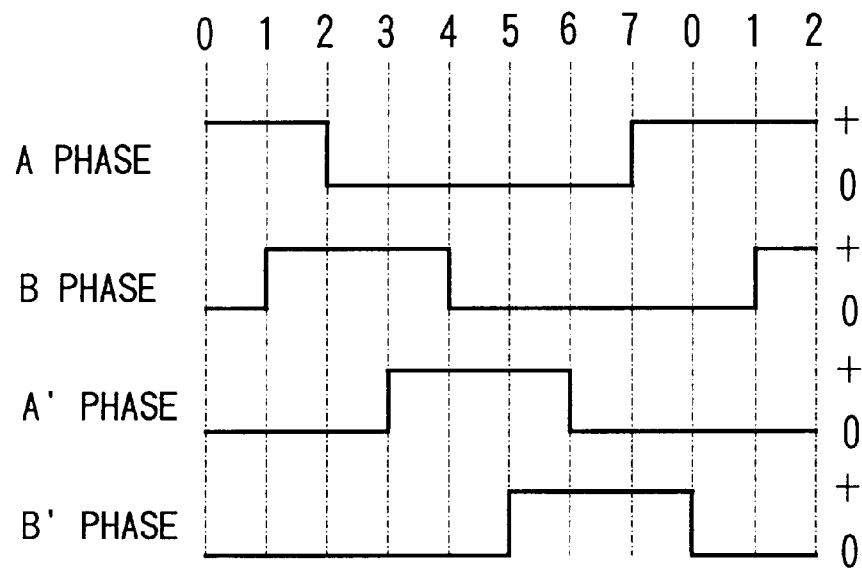

FIG. 7 shows timing charts for explaining the drive control of the stepping motor 9' by the focusing control circuit 403 in the present embodiment.

FIG. 7(A) is a timing chart of the 2-phase excitation drive mode. This timing chart shows the timings at which electricity is made to flow through the respective stators for the A, B, A', and B' phases in each step, with the horizontal-axis indicating the number of steps and the longitudinal-axis indicating the condition of passage of electricity.

As can be understood from this figure, in the 2-phase excitation drive mode, the motor is driven by four steps in a single rotation.

FIG. 7(B) is a timing chart of the 1–2-phase excitation drive mode. This timing chart shows the timings at which electricity is made to flow through the respective stators for the A, B, A', and B' phases in each step, with the horizontal-axis indicating the number of steps and the longitudinal-axis indicating the condition of passage of electricity.

As can be understood from this figure, in the 1–2-phase excitation drive mode, the motor is driven by eight steps in a single rotation.

A comparison of the motor drive characteristics of the 2-phase excitation drive mode and the 1–2-phase excitation drive mode using these timing charts shows that, in comparison to the 2-phase excitation drive mode, the amount of rotation is halved for the same number of steps in the 1–2-phase excitation drive mode, even though drive at half the pitch (step angle) is enabled.

Thus when the 2-phase excitation drive mode is selected by the drive mode selection circuit 301a in the lens CPU 301, given the same pulse rate, drive at twice the speed that of 1–2-phase excitation drive is enabled even though the resolution will be low.

On the other hand, when the 1–2-phase excitation drive mode is selected, drive at a high precision of twice the resolution of 2-phase excitation drive is enabled.

Figure 8:
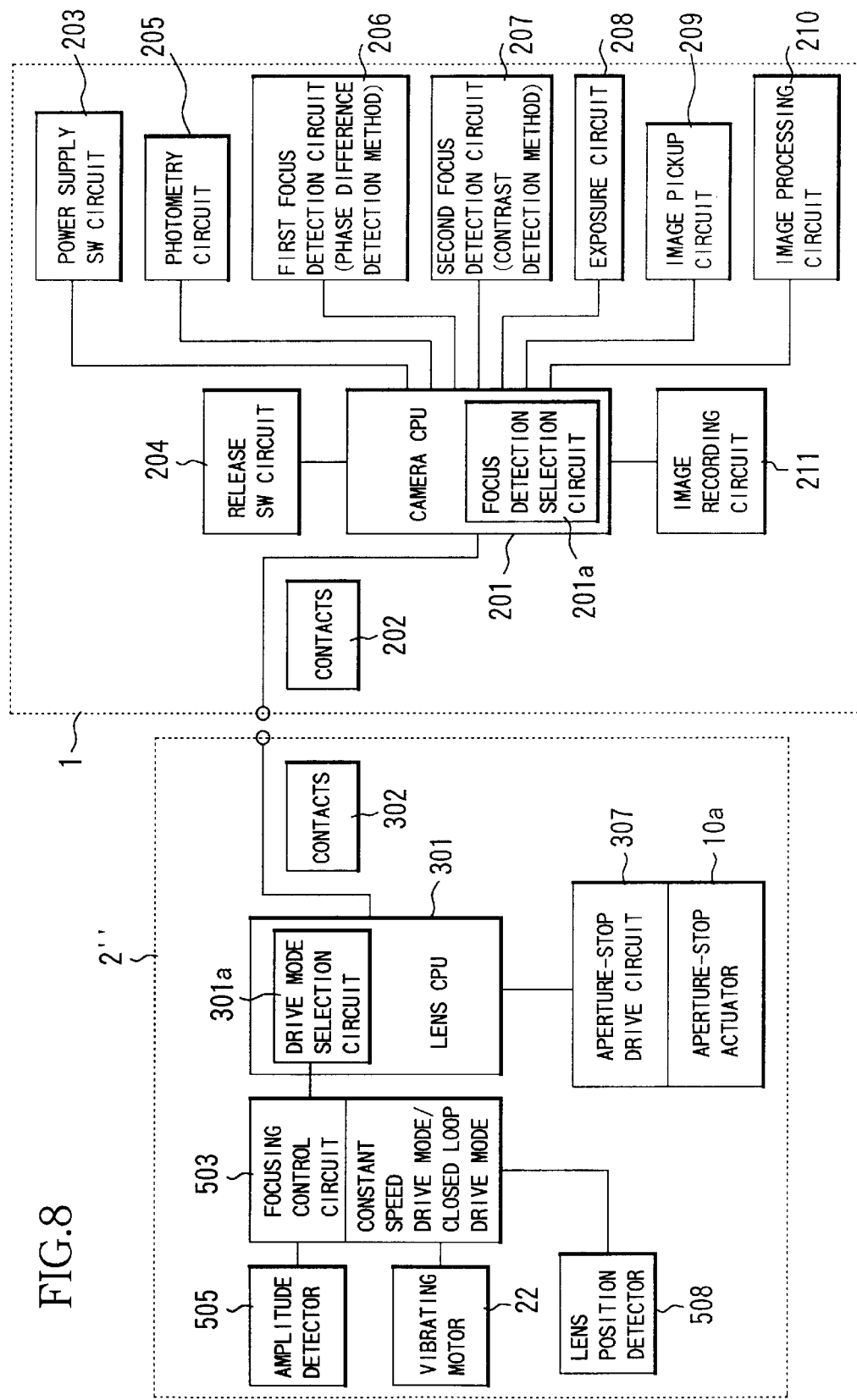
FIG. 8 is a block diagram of a lens-exchangeable, single-lens reflex digital camera system, which is another embodiment of this invention.

FIG. 8 is a block diagram of a lens-exchangeable, digital, single-lens reflex camera system, which is another embodiment of this invention.

With this embodiment, a vibration type motor 22 is provided as the focusing actuator in an exchangeable lens 2" and the arrangement of a focusing control circuit 503 is changed accordingly from the focusing control circuit 203, 204 of the above-described embodiments. Furthermore, an amplitude detector 505, which detects the excitation vibration condition of vibration type motor 22, and a lens position detector 508, which detects the position of focus lens 8, are added. Besides these points, this embodiment is the same as the embodiment shown in FIG. 2, and components that are in common are provided with the same symbols as the embodiment shown in FIG. 2 and descriptions thereof shall be omitted.

When the drive mode is selected by the drive mode selection circuit 301a in the lens CPU 301 in accordance with the information, received from the camera 1 side, that indicates which focus detection circuit(206, 207)'s output has been selected, the focusing control circuit 503 performs drive control of vibration type motor 22 in accordance with the selected drive mode and thereby drives the focus lens 8 shown in FIG. 1 to perform the focusing operation.

Figure 12:
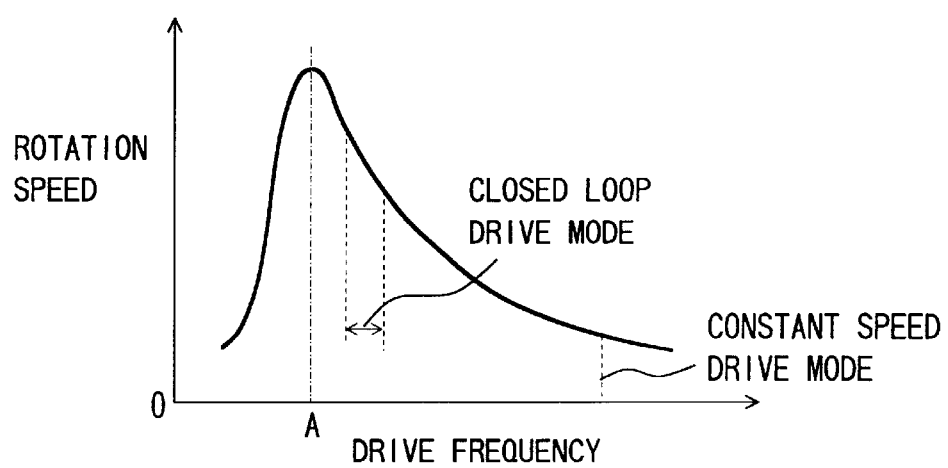
FIG. 12 is a characteristics diagram of the vibration type motor.

Here, the drive modes that are provided are the closed loop drive mode, in which vibration type motor 22 is driven while applying feedback, based on the result of excitation condition detection by the amplitude detector 505, so that the drive frequency will be a low frequency (at which the motor rotates at high speed) close to the high frequency side of resonance frequency A in the graph of FIG. 12 and the constant speed drive mode, in which the vibration type motor 22 is driven at a fixed, high frequency (at which the motor rotates at a low speed). FIG. 12 shows the relationship between the drive frequency and motor rotation speed. In the graph of FIG. 12, the horizontal-axis indicates the frequency (drive frequency) of the drive signal that is applied to the vibration type motor 22 and the longitudinal-axis indicates the rotation speed of vibration type motor 22. With the horizontal-axis, the frequency increases towards the right side, and with the longitudinal-axis, the rotation speed increases towards the up side.

Position detector 508 generates pulse signals in accordance with the movement of the focus lens 8. The amount of movement of the focus lens 8 per pulse is set smaller than the focusing precision that is allowed in the constant speed drive mode (the mode by which high focusing precision is obtained by use of the output of the second focus detection circuit 207).

With the above arrangement, when the output of the first focus detection circuit 206, which performs focusing condition detection by the phase difference detection method, is selected by the focus detection selection circuit 201a inside the camera CPU 201 (when the defocus amount is greater than the predetermined value), the drive mode selection circuit 301a inside the lens CPU 301 selects the closed loop drive mode. In this case, the focusing control circuit 503 makes the vibration type motor 22 rotate at high speed by applying feedback, based on the result of excitation condition detection by the amplitude detector 505, so that the drive frequency will be in a low frequency range close to the high frequency side of the resonance frequency A.

In this process, the focusing control circuit 503 drives the vibration type motor 22 so that the drive position of the focus lens 8 that is detected by the lens position detector 508 reaches the target drive position that was computed based on the defocus amount. Rough focusing of the focus lens 8 is thereby performed at high speed.

Thereafter, when the defocus amount becomes less than or equal to the predetermined value and the output from the second focus detection circuit 207, that is, the result of focusing condition detection (computation) by the contrast detection method is selected by the focus detection selection circuit 201a, the drive mode selection circuit 301a selects the constant speed drive mode.

In this case, the focusing control circuit 503 drives the vibration type motor 22 at a low speed by means of a fixed drive frequency (shown in FIG. 12) that has been stored in advance in a memory (not shown) inside the focusing control circuit 503. And while monitoring the output of the lens position detector 508, the focusing control circuit 503 drives the focus lens 8 by an amount corresponding to one pulse of this output at a time. The focus lens 8 is thereby driven and a high-precision focusing operation is performed to the position at which the contrast (high frequency components) detected by the second focus detection circuit 207 is maximized.

In the case where the defocus amount is less than or equal to the abovementioned predetermined value from the beginning and the output of the second focus detection circuit 207 has been selected, focusing operation of the focus lens 8 by drive control of the vibration type motor 22 in the constant speed drive mode is performed.

Figure 9:
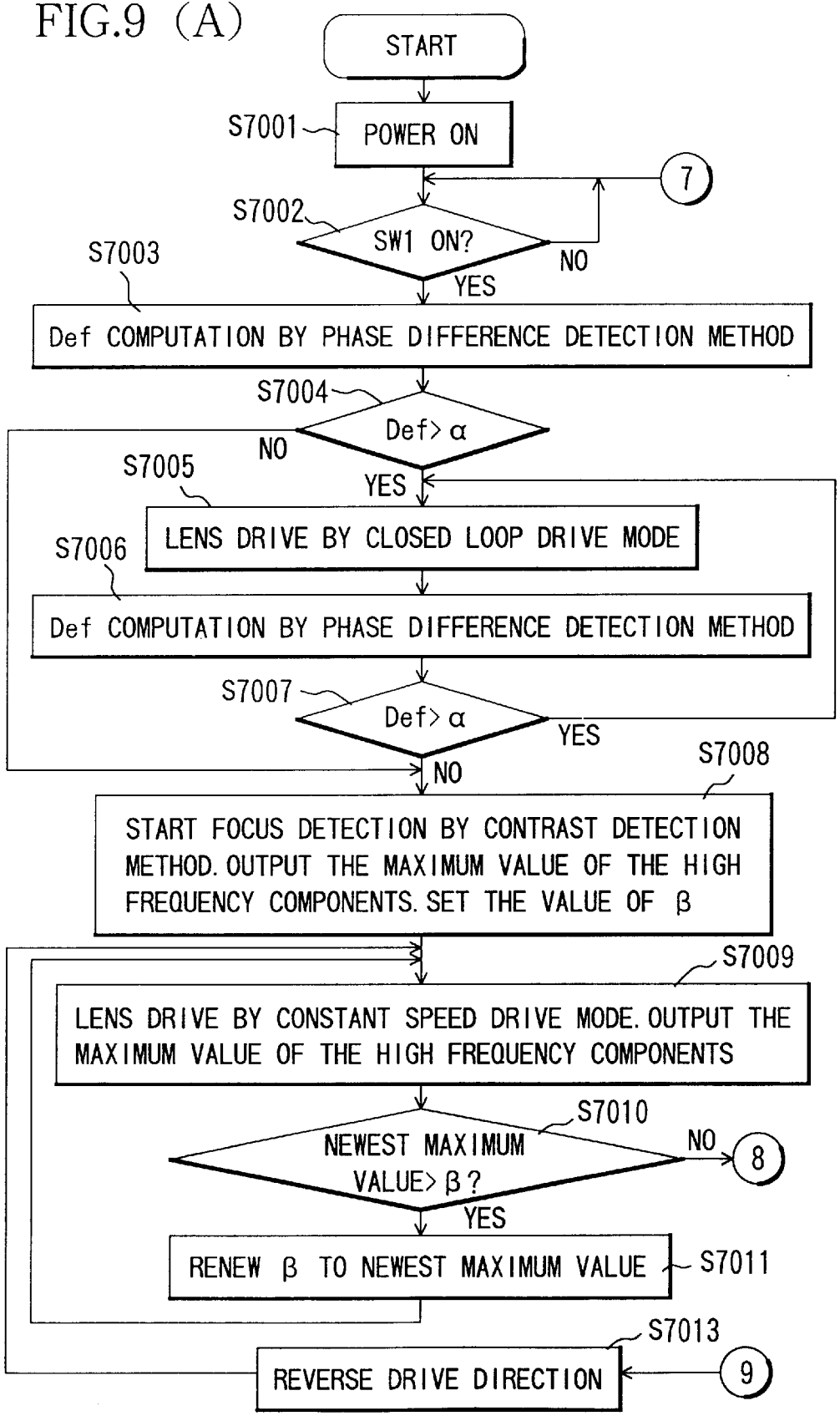
FIG. 9 is a flowchart, which illustrates the operation of the digital camera system of FIG. 8.
Figure 9:
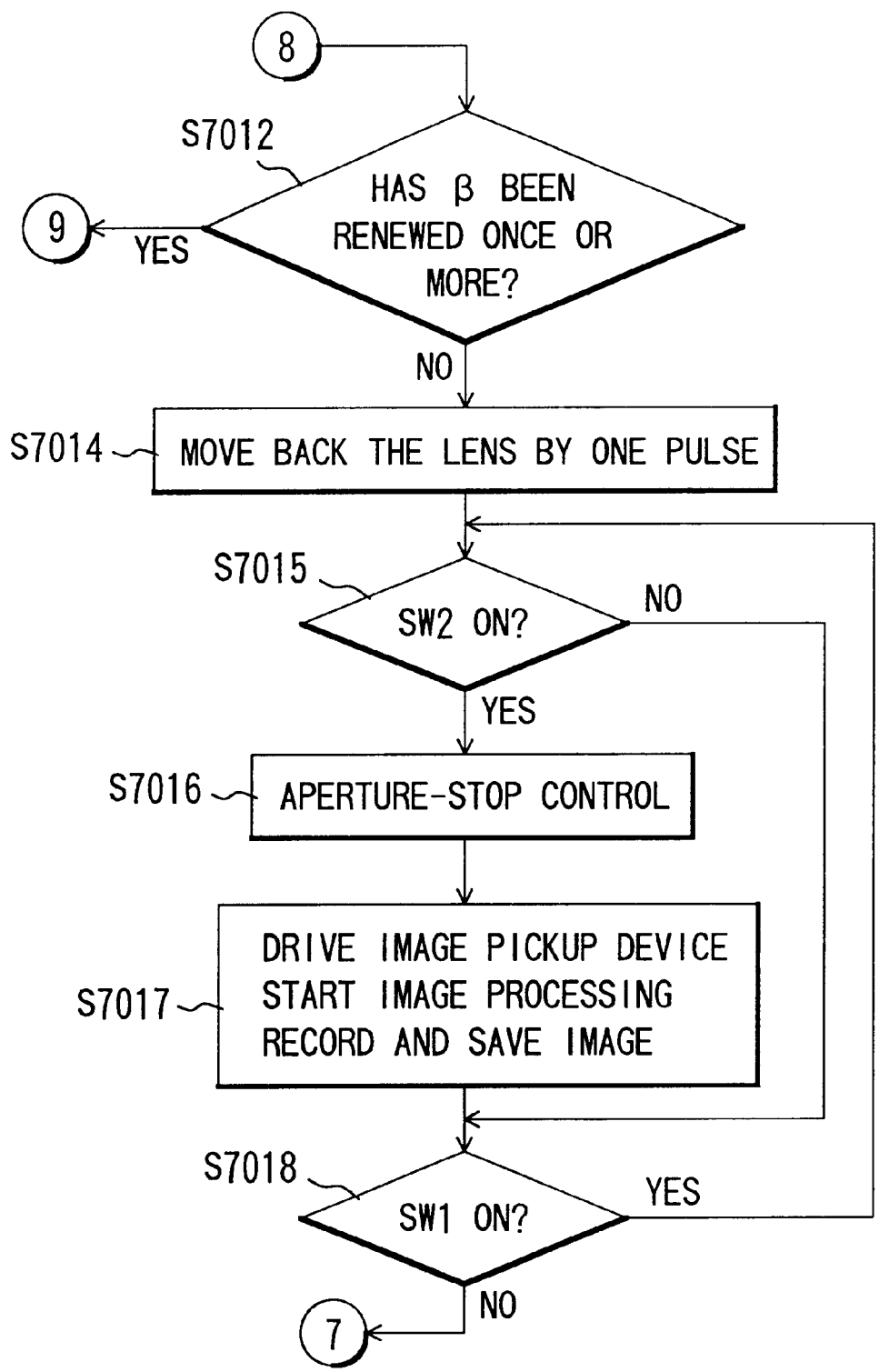

FIG. 9 is a flowchart, which illustrates the principle operations of the camera system shown in FIG. 8.

First, when the power supply SW circuit 203, shown in FIG. 8, becomes ON (step (abbreviated as "S" in the Figure) 7001), the supply of power to the exchangeable lens 2" is started (or in the case where new batteries are loaded in the camera 1 or in the case where the exchangeable lens 2" is installed on the camera 1, etc., communication between the camera 1 and the exchangeable lens 2 is started).

The camera CPU 201 then judges whether or not the SW1 signal is generated from the release SW circuit 204 in accordance with the ON operation of the first stroke switch SW1 (step 7002) and, if the signal is generated, performs focusing condition detection by the phase difference detection method using the first focus detection circuit 206, in other words, performs the computation of the defocus amount (shall be referred to hereinafter as "Def") (step 7003).

The focus detection selection circuit 201a inside the camera CPU 201 then judges whether or not the computed defocus amount Def is greater than the predetermined value $\alpha$ (step 7004) and if Def is greater than the value $\alpha$, a signal expressing that the output from the first focus detection circuit 206 is used is sent from the camera CPU 201 to the lens CPU 301 and a step 7005 is entered. If the defocus amount Def is less than or equal to the predetermined value $\alpha$, a signal expressing that the output from the second focus detection circuit 207 is used is sent from the camera CPU 201 to the lens CPU 301 and a step 7008 is entered.

In the step 7005, the drive mode selection circuit 301a inside the lens CPU 301 selects the closed loop drive mode in accordance with the signal sent from the camera CPU 201 in the step 7004. Also, based on the Def information sent from the camera 1 side, the focusing control circuit 503 computes the target drive position of the focus lens 8. The focusing control circuit 503 then makes the vibration type motor 22 rotate at a high speed by applying feedback, based on the result of excitation condition detection by the amplitude detector 505, so that the drive frequency will be a low frequency close to the high frequency side of the resonance frequency A and thereby drives the focus lens 8 until the position detected by the lens position detector 508 reaches the target drive position.

After stoppage of the focus lens 8, Def computation by the first focus detection circuit 206 is performed again (step 7006), whether or not the computed Def is greater than the predetermined value $\alpha$ is judged again (step 7007), and if the computed defocus amount Def is greater than the predetermined value $\alpha$, the step 7005 is returned to or if the computed defocus Def is less than or equal to the predetermined value $\alpha$, a step 7008 is entered.

In the step 7008, focusing condition detection by the contrast detection method using the second focus detection circuit 207 is started, the high frequency components of the subject image formed on the image pickup device 4, shown in FIG. 1, are extracted, and the maximum value of these high frequency components is output. The camera CPU 201 sends a signal expressing this maximum value to the focusing control circuit 503 via the lens CPU 301 and the focusing control circuit 503 sets this maximum value as β.

Meanwhile, the drive mode selection circuit 301a in the lens CPU 301 selects the constant speed drive mode in accordance with the signal sent from the camera CPU 201 in the step 7004. The focusing control circuit 503 makes the vibration type motor 22 rotate at a low speed by means of a fixed drive frequency that has been stored in advance in a memory (not shown) inside the focusing control circuit 503. While monitoring the output of the lens position detector 508, the focusing control circuit 503 drives the focus lens 8 by an amount corresponding to one pulse of this output.

After this drive by an amount corresponding to one pulse, the second focus detection circuit 207 is made to extract the high frequency components of the subject image and output the maximum value again (step 7009). The camera CPU 201 sends the signal expressing this maximum value (the newest maximum value) to the focusing control circuit 503 via the lens CPU 301.

The focusing control circuit 503 compares this newest maximum value with the priorly set β (step 7010), and a step 7011 is entered if the newest maximum value is greater than β, while a step 7012 is entered if the newest maximum value is less than or equal to β.

In the step 7011, the focusing control circuit 503 renews the value of β to the newest maximum value and then a return to a step 7009 is performed.

In the step 7012, the focusing control circuit 503 judges whether or not the renewal of the value of β has been performed once or more and if renewal has been performed once or more, judges that the peak of the maximum value has been exceeded and a step 7014 is entered. If renewal has not been performed even once, it is judged that the focusing direction is the opposite direction, a step 7013 is entered. In the step 7013, the driving direction of the vibration type motor 22 is reversed. And the step 7009 is returned to. In the step 7014, the vibration type motor 22 is driven in the opposite direction by an amount corresponding to one pulse of output of the lens position detector 508 and then the focusing operation is ended.

When the focusing operation is thus ended, the camera CPU 201 judges whether or not the SW2 signal that is output with the ON operation of the second stroke switch is generated by release SW circuit 204 (step 7015) and, if the SW2 signal is not generated, judges again whether or not the SW1 signal is generated (step 7018). Here, if the SW1 signal is also not generated, the step 7002 is returned to. Also, if in the step 7018, the SW2 signal is not generated but the SW1 signal is generated, a return to the step 7015 is performed.

If in the step 7015, the SW1 signal is generated from the release SW circuit 204, the lens CPU 301 controls the aperture-stop drive circuit 307 of the aperture-stop unit 10 (step 7016). Also, the camera CPU 201 drives the image pickup device 4 shown in FIG. 1 and makes photoelectric conversion of the optical image formed on the image pickup device 4 be performed. The camera CPU 201 then makes the image processing circuit 210 process the image signal resulting from photoelectric conversion and records and saves the image signal in an unillustrated recording medium by means of the image recording circuit 211 (step 7017).

The camera CPU 201 then checks the condition of the SW1 signal (step 7018) and when the SW1 signal is no longer generated, a return to the step 7002 is performed.

With the camera system of the present embodiment, the above series of operations is repeated until power SW circuit 203 is turned OFF, and when the power is turned OFF, the camera CPU 201 and the lens CPU 301 end communication and the supply of power to the exchangeable lens 2" is also ended.

Though a lens-exchangeable, digital, single-lens reflex camera system was described with the present embodiment, this invention may also be applied to an integral-lens type digital camera system.

Also, though with the present embodiment, the case where focus detection units, which make use of the phase difference detection method, as a so-called passive range finding method, and the contrast detection method, are used as the first and second focus detection units was described, focus detection units may be equipped which use a so-called active range finding method, in which the reflected light of light projected onto a subject is used to detect the focusing condition, and the contrast detection method.

The drive control of the vibration type motor 22 of the present embodiment shall now be described in more detail by use of FIGS. 10 and 11.

Figure 10:
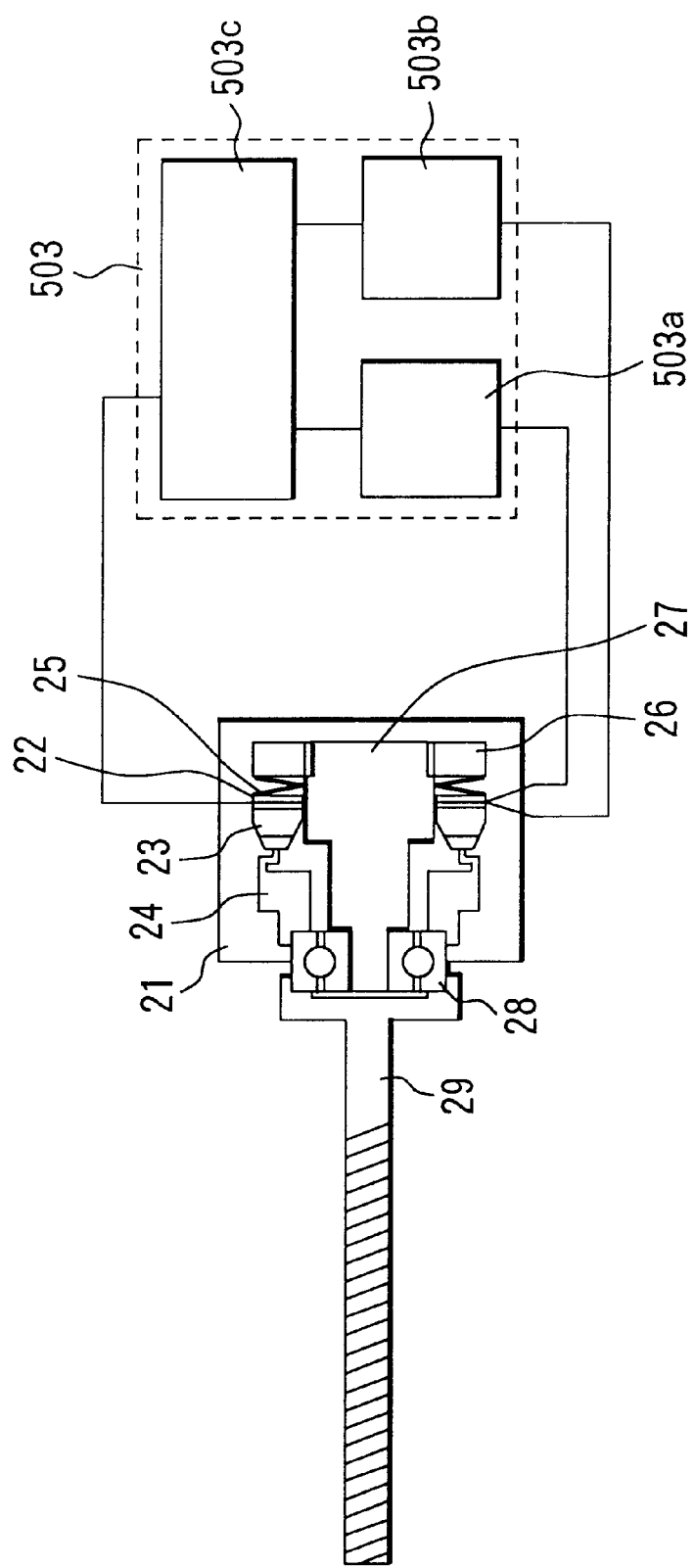
FIG. 10 is an arrangement diagram of a vibration type motor and a focusing control circuit in the digital camera system of FIG. 8.
Figure 11:
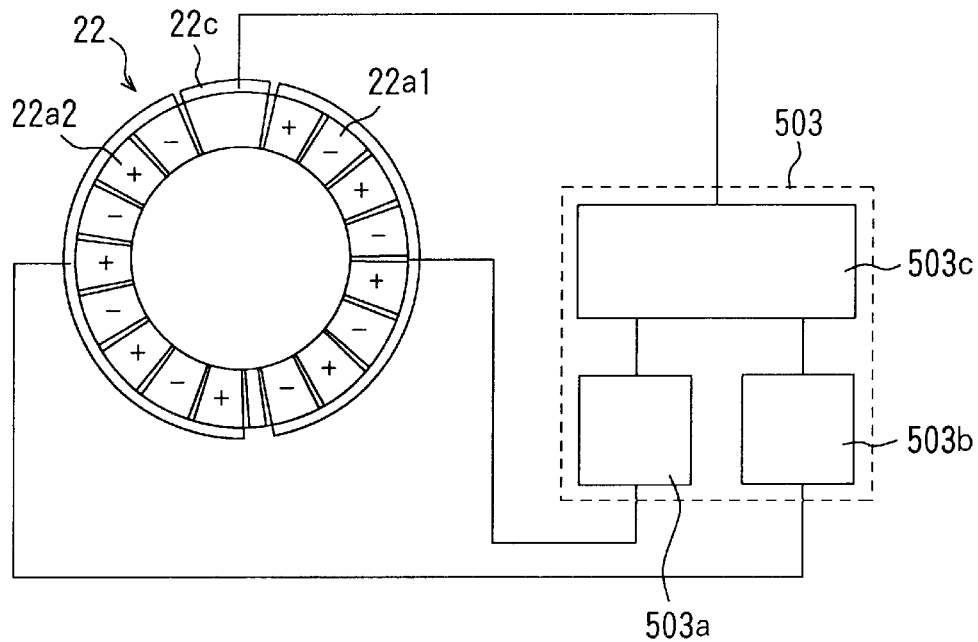
FIG. 11 is an arrangement diagram of the vibration type motor and the focusing control circuit in the digital camera system of FIG. 8.

FIGS. 10 and 11 are diagrams for explaining the arrangement of the vibration type motor 22 and the focusing control circuit 503.

The Vibration type motor 22 comprises the following parts. In FIG. 10, 23 denotes a ring-shaped vibrating member and onto the rear surface side of this vibrating member 23 are adhered a piezoelectric element 22a, which has been polarized into a plurality of poles as shown in FIG. 11. The piezoelectric element 22a comprises an A-phase part 22a1 and a B-phase part 22a2 and sinusoidal voltages, which are mutually shifted in phase, are applied to the A-phase part 22a1 and the B-phase part 22a2 from a driver part of the focusing control circuit 503. A deflection motion is thereby generated in each of the A-phase part 22a1 and the B-phase part 22a2.

By the synthesis of these deflection motions, a progressive vibration is generated at the front surface of vibrating member 23. A C-phase piezoelectric element 22c converts the amplitude of the deflection of the vibrating member 23 into voltage and outputs this voltage to the focusing control circuit 30.

In FIG. 10, 24 denotes a rotor, which is pressed against the front surface of the vibrating member 23 by the urging force of a spring 25. Thus when a progressive vibration is generated at the surface of the vibrating member 23, rotor 24 is driven to rotate by the friction with the vibrating member 23.

26 denotes a pressure adjustment ring, which adjusts the pressing force of spring 25, and 27 denotes a supporting member, which supports the components of the vibration type motor 22.

28 denotes a bearing, the inner ring side of which is integrally mounted to the supporting member 27 and the outer ring side of which is integrally mounted to the rotor 24 and a lead screw 29. Thus when the rotor 24 rotates, the lead screw 29 rotates integrally with the rotor 24.

The focusing control circuit 503 comprises an A-phase driver part 503a, which makes electricity flow through the A-phase part 22a1 of piezoelectric element 22a, a B-phase driver part 503b, which makes electricity flow through the B-phase part 22a2, and a control part 503c, which controls these A-phase driver part 503a and B-phase driver part 503b.

The control part 503c controls the A-phase driver part 503a and the B-phase driver part 503b based on the drive mode selection information, lens drive amount information, and drive direction information provided by the lens CPU 301 and the drive amplitude information from the C-phase piezoelectric element 22c.

With the above arrangement, in the case where the closed loop drive mode has been selected by the drive mode selection circuit 301a inside the lens CPU 301, the drive amplitude information concerning the vibrating member 23 is input from the C-phase piezoelectric element 22c into the control part 503c. The control part 503c judges whether or not vibration is carried out near the high frequency side of the resonance frequency A, shown in FIG. 12. And if the drive frequency is higher than the resonance frequency A by a predetermined frequency or more, the A-phase driver part 503a and the B-phase driver part 503b are controlled to make the frequency of the drive signal applied to the A-phase part 22a1 and the B-phase part 22a2 of the piezoelectric element 22a close to the resonance frequency A. Drive position information on the focus lens 8 is input from the lens position detector 508 into the control part 503c, and the control part 503c makes the vibration type motor 22 rotate until this drive position information reaches the target drive position that has been computed in advance by the lens CPU 301 as has been described above.

By performing such control, the vibration type motor 22 can be constantly driven at a frequency close to the resonance frequency A, regardless of the variation of the resonance frequency due to temperature change, etc., during driving. And the vibration type motor 22, with which the maximum controllable speed can be obtained in a range near the resonance frequency, can be driven constantly at the maximum speed.

On the other hand, when the constant speed drive mode has been selected by the drive mode selection circuit 301a, the control part 503c controls the A-phase driver part 503a and the B-phase driver part 503b and sets the frequency of the drive signals to be applied to the A-phase part 22a1 and the B-phase part 22a2 of piezoelectric element 22a to the fixed, high frequency that has been stored in advance in the control part 503c to drive the vibration type motor 22 at a low and constant speed. In this process, the control part 503c makes the vibration type motor 22 rotate until the drive position information on the focus lens 8 that is provided from the lens position detector 508 changes by an amount corresponding to one pulse.

The abovementioned stored frequency is set in consideration of the width of one pulse of the lens position detector 508 to a frequency that realizes a low-speed rotation by which an adequate stop position precision can be maintained.

The microscopic drive corresponding to one pulse of the lens position detector 508 can thus be accommodated to enable highly precise position control.

As has been described above, with each of the above-described embodiments, high speed and high precision of autofocus can be realized at the same time in a camera system, which uses a plurality of focus detection methods in combination, by performing optimal lens drive control according to focus detection unit.

While preferred embodiments have been described, it is to be understood that modification and variation of the present invention may be made without departing from the spirit and scope of the following claims.

What is claimed is:

1. A camera system comprising:
   an image-taking optical system, which forms a subject image from the light flux that has entered the image-taking optical system;
   a first focus detection unit, which detects the focusing condition of said image-taking optical system;
   a second focus detection unit, which detects the focusing condition of said image-taking optical system at a higher precision than said first focus detection unit;
   a stepping motor, which drives a focus lens included in said image-taking optical system;
   a control circuit, which selectively uses information based on the output from said first focus detection unit and information based on the output from said second focus detection unit to control said stepping motor; and
   a rotation detector, which detects the rotation phase of said stepping motor; wherein
   said control circuit performs closed loop control, based on the output of said rotation detector, when controlling said stepping motor using the information based on the output of said first focus detection unit, and performs open control for driving said stepping motor a predetermined number of steps at a time, when controlling said stepping motor using the information based on the output of said second focus detection unit.

2. The camera system according to claim 1, wherein
   said first focus detection unit detects the focusing condition of said image-taking optical system by a phase difference detection method, and said second focus detection unit detects the focusing condition of said image-taking optical system by a contrast detection method.

3. The camera system according to claim 1, wherein
   said control circuit controls said stepping motor using the information based on the output of said first focus detection unit when the information based on the output of said first focus detection unit indicates said image-taking optical system to be in an out-of-focus condition that falls outside a predetermined range, and controls said stepping motor using the information based on the output of said second focus detection unit when the information based on the output of said first focus detection unit indicates said image-taking optical system to be in an out-of-focus condition that is within said predetermined range.

4. A camera system comprising:
   an image-taking optical system, which forms a subject image from the light flux that has entered the image-taking optical system;
   a first focus detection unit, which detects the focusing condition of said image-taking optical system;
   a second focus detection unit, which detects the focusing condition of said image-taking optical system at a higher precision than said first focus detection unit;
   a stepping motor, which drives a focus lens included in said image-taking optical system; and
   a control circuit, which selectively uses information based on the output from said first focus detection unit and information based on the output from said second focus detection unit to control said stepping motor; wherein
   said control circuit drives said stepping motor by a 2-phase excitation method when controlling said stepping motor using the information based on the output of said first focus detection unit, and drives said stepping motor by a 1–2-phase excitation method or microstep method when controlling said stepping motor using the information based on the output of said second focus detection unit.

5. The camera system according to claim 4, wherein
   said first focus detection unit detects the focusing condition of said image-taking optical system by a phase difference detection method, and said second focus detection unit detects the focusing condition of said image-taking optical system by a contrast detection method.

6. The camera system according to claim 4, wherein
said control circuit controls said stepping motor using the information based on the output of said first focus detection unit when the information based on the output of said first focus detection unit indicates said image-taking optical system to be in an out-of-focus condition that falls outside a predetermined range, and controls said stepping motor using the information based on the output of said second focus detection unit when the information based on the output of said first focus detection unit indicates said image-taking optical system to be in an out-of-focus condition that is within said predetermined range.

7. A camera system comprising:
an image-taking optical system, which forms a subject image from the light flux that has entered the image-taking optical system;
a first focus detection unit, which detects the focusing condition of said image-taking optical system;
a second focus detection unit, which detects the focusing condition of said image-taking optical system at a higher precision than said first focus detection unit;
a vibration type motor, which drives a focus lens included in said image-taking optical system;
a control circuit, which selectively uses information based on the output from said first focus detection unit and information based on the output from said second focus detection unit to control said vibration type motor; and
a vibration condition detector, which detects the vibration condition of said vibration type motor; wherein
said control circuit performs closed loop control, by which the drive frequency is controlled based on the output of said vibration condition detector, when controlling said vibration type motor using the information based on the output of said first focus detection unit, and performs control for applying a drive signal of fixed frequency to said vibration type motor, when controlling said vibration type motor using the information based on the output of said second focus detection unit.

8. The camera system according to claim 7, wherein
said first focus detection unit detects the focusing condition of said image-taking optical system by a phase difference detection method, and said second focus detection unit detects the focusing condition of said image-taking optical system by a contrast detection method.

9. The camera system according to claim 7, wherein
said control circuit controls said vibration type motor using the information based on the output of said first focus detection unit when the information based on the output of said first focus detection unit indicates said image-taking optical system to be in an out-of-focus condition that falls outside a predetermined range and controls said vibration type motor using the information based on the output of said second focus detection unit when the information based on the output of said first focus detection unit indicates said image-taking optical system to be in an out-of-focus condition that is within said predetermined range.

10. A lens apparatus which is provided with an image-taking optical system that forms a subject image from the light flux that has entered the image-taking optical system, and is detachably mountable to a camera which comprises a first focus detection unit that detects the focusing condition of said image-taking optical system and a second focus detection unit that detects the focusing condition of said image-taking optical system at a higher precision than said first focus detection unit, furthermore comprising:
a communication circuit, which enable communication of information with said camera;
a stepping motor, which drives a focus lens included in said image-taking optical system;
a control circuit, which selectively uses information based on the output from said first focus detection unit and information based on the output from said second focus detection unit to control said stepping motor; and
a rotation detector, which detects the rotation phase of said stepping motor; wherein
said control circuit performs closed loop control, based on the output of said rotation detector, when controlling said stepping motor using the information based on the output of said first focus detection unit, which has been received from said camera via the communication circuit, and performs open control for driving said stepping motor a predetermined number of steps at a time, when controlling said stepping motor using the information based on the output of said second focus detection unit.

11. The lens apparatus according to claim 10, wherein
said control circuit controls said stepping motor using the information based on the output of said first focus detection unit when the information based on the output of said first focus detection unit indicates said image-taking optical system to be in an out-of-focus condition that falls outside a predetermined range, and controls said stepping motor using the information based on the output of said second focus detection unit when the information based on the output of said first focus detection unit indicates said image-taking optical system to be in an out-of-focus condition that is within said predetermined range.

12. A lens device which is provided with an image-taking optical system that forms a subject image from the light flux that has entered the image-taking optical system, and is detachably mountable to a camera which comprises a first focus detection unit that detects the focusing condition of said image-taking optical system and a second focus detection unit that detects the focusing condition of said image-taking optical system at a higher precision than said first focus detection unit, furthermore comprising:
a communication circuit, which enable communication of information with said camera;
a stepping motor, which drives a focus lens included in said image-taking optical system; and
a control circuit, which selectively uses information based on the output from said first focus detection unit and information based on the output from said second focus detection unit to control said stepping motor; wherein
said control circuit drives said stepping motor by a 2-phase excitation method when controlling said stepping motor using the information based on the output of said first focus detection unit, which has been received from said camera via communication contacts, and drives said stepping motor by a 1–2-phase excitation method or microstep method when controlling said stepping motor using the information based on the output of said second focus detection unit.

13. The lens apparatus according to claim 12, wherein
said control circuit controls said stepping motor using the information based on the output of said first focus detection unit when the information based on the output of said first focus detection unit indicates said image-taking optical system to be in an out-of-focus condition that falls outside a predetermined range, and controls said stepping motor using the information based on the output of said second focus detection unit when the information based on the output of said first focus detection unit indicates said image-taking optical system to be in an out-of-focus condition that is within said predetermined range.

14. A lens apparatus which is provided with an image-taking optical system that forms a subject image from the light flux that has entered the image-taking optical system and is detachably mountable to a camera which comprises a first focus detection unit that detects the focusing condition of said image-taking optical system and a second focus detection unit that detects the focusing condition of said image-taking optical system at a higher precision than said first focus detection unit, furthermore comprising:

a communication circuit, which enable communication of information with said camera;

a vibration type motor, which drives a focus lens included in said image-taking optical system;

a control circuit, which selectively uses information based on the output from said first focus detection unit and information based on the output from said second focus detection unit to control said vibration type motor; and a vibration condition detector, which detects the vibration condition of said vibration type motor; wherein said control circuit performs closed loop control, by which the drive frequency is controlled based on the output of said vibration condition detector, when controlling said vibration type motor using the information based on the output of said first focus detection unit, and performs control for applying a drive signal of fixed frequency to said vibration type motor, when controlling said vibration type motor using the information based on the output of said second focus detection unit.

15. The lens apparatus according to claim 14, wherein said control circuit controls said vibration type motor using the information based on the output of said first focus detection unit when the information based on the output of said first focus detection unit indicates said image-taking optical system to be in an out-of-focus condition that falls outside a predetermined range, and controls said vibration type motor using the information based on the output of said second focus detection unit when the information based on the output of said first focus detection unit indicates said image-taking optical system to be in an out-of-focus condition that is within said predetermined range.

* * * * *

UNITED STATES PATENT AND TRADEMARK OFFICE
CERTIFICATE OF CORRECTION

PATENT NO. : 6,603,929 B2
DATED : August 5, 2003
INVENTOR(S) : Masanori Ishikawa et al.

It is certified that error appears in the above-identified patent and that said Letters Patent is hereby corrected as shown below:

<u>Title page,</u>
Item [75], the inventors' addresses should read as follows:
-- Masanori Ishikawa, Tokyo (JP);
Toru Kawai, Kanagawa (JP);
Ryuji Suzuki, Saitama (JP);
Seiichi Kashiwaba, Tochigi (JP);
Shigeki Sato, Tochigi (JP) --

<u>Column 17,</u>
Line 52, "SW1" should read -- SW2 --

Signed and Sealed this

Twenty-seventh Day of January, 2004

JON W. DUDAS
*Acting Director of the United States Patent and Trademark Office*